(12) United States Patent
Wang et al.

(10) Patent No.: US 7,724,740 B1
(45) Date of Patent: *May 25, 2010

(54) COMPUTER SYSTEM AND NETWORK INTERFACE SUPPORTING CLASS OF SERVICE QUEUES

(75) Inventors: Chi-Lie Wang, Fremont, CA (US); BaoDong Hu, Milpitas, CA (US); Scott W. Mitchell, San Jose, CA (US)

(73) Assignee: 3Com Corporation, Marlborough, MA (US)

( * ) Notice: Subject to any disclaimer, the term of this patent is extended or adjusted under 35 U.S.C. 154(b) by 970 days.

This patent is subject to a terminal disclaimer.

(21) Appl. No.: 10/228,488

(22) Filed: Aug. 27, 2002

(51) Int. Cl.
*H04L 12/28* (2006.01)
*H04J 3/24* (2006.01)

(52) U.S. Cl. ...................................... 370/392; 370/474

(58) Field of Classification Search .................. None
See application file for complete search history.

(56) References Cited

U.S. PATENT DOCUMENTS

| | | | |
|---|---|---|---|
| 4,500,990 A | 2/1985 | Akashi | |
| 4,783,730 A | 11/1988 | Fischer | 364/200 |
| 5,121,383 A | 6/1992 | Golestani | 370/60 |
| 5,212,778 A | 5/1993 | Dalley et al. | 711/218 |
| 5,473,607 A | 12/1995 | Hausman et al. | |
| 5,530,703 A | 6/1996 | Liu et al. | |
| 5,615,340 A | 3/1997 | Dai et al. | |

(Continued)

FOREIGN PATENT DOCUMENTS

WO   WO 00/52869   9/2000

(Continued)

OTHER PUBLICATIONS

"Network Device Class" Microsoft Corporation, published at http://www.microsoft.com/hwdev/specs/PMref/PMnetwork.htm. pp. 1-11, dated Sep. 23, 1999.

*Primary Examiner*—Chi H Pham
*Assistant Examiner*—Warner Wong
(74) *Attorney, Agent, or Firm*—McDonnell Boehnen Hulbert & Berghoff LLP

(57) ABSTRACT

A data processing system adapted for high-speed network communications, a method for managing a network interface and a network interface for such system, are provided, in which processing of packets received over the network is achieved by embedded logic at the network interface level. Incoming packets on the network interface are parsed and classified as they are stored in a buffer memory. Functional logic coupled to the buffer memory on the network interface is enabled to access any data field within a packet in a single cycle, using pointers and packet classification information produced by the parsing and classifying step. Results of operations on the data fields in the packets are available before the packets are transferred out of the buffer memory. A data processing system, a method for management of a network interface and a network interface are also provided by the present invention that include an embedded firewall at the network interface level of the system, which protects against inside and outside attacks on the security of data processing system. Furthermore, a data processing system, a method for management of a network interface and a network interface are a provided by the present invention that support class of service management for packets incoming from the network, by applying priority rules at the network interface level of the system.

26 Claims, 13 Drawing Sheets

U.S. PATENT DOCUMENTS

| | | | |
|---|---|---|---|
| 5,828,835 A | 10/1998 | Isfeld et al. | 395/200.3 |
| 5,835,724 A | 11/1998 | Smith | 709/227 |
| 5,838,915 A | 11/1998 | Klausmeier et al. | 395/200.45 |
| 5,881,242 A * | 3/1999 | Ku et al. | 709/238 |
| 5,909,686 A | 6/1999 | Muller et al. | |
| 5,917,821 A * | 6/1999 | Gobuyan et al. | 370/392 |
| 5,933,413 A | 8/1999 | Merchant et al. | 370/234 |
| 5,953,341 A | 9/1999 | Yamanaka et al. | 370/416 |
| 5,987,113 A | 11/1999 | James | 379/211.01 |
| 6,026,090 A | 2/2000 | Benson et al. | 370/395.7 |
| 6,052,375 A | 4/2000 | Bass et al. | 370/412 |
| 6,070,219 A | 5/2000 | McAlpine et al. | 710/263 |
| 6,108,713 A | 8/2000 | Sambamurthy et al. | |
| 6,138,189 A | 10/2000 | Kalkunte | 710/53 |
| 6,151,321 A | 11/2000 | Benson et al. | 370/395.42 |
| 6,154,446 A | 11/2000 | Kadambi et al. | |
| 6,154,465 A * | 11/2000 | Pickett | 370/466 |
| 6,163,539 A | 12/2000 | Alexander et al. | |
| 6,199,137 B1 | 3/2001 | Aguilar et al. | 710/305 |
| 6,226,680 B1 | 5/2001 | Boucher et al. | 709/230 |
| 6,246,691 B1 | 6/2001 | Briem et al. | 370/412 |
| 6,247,061 B1 | 6/2001 | Douceur et al. | 709/240 |
| 6,286,052 B1 | 9/2001 | McCloghrie et al. | 709/238 |
| 6,356,951 B1 | 3/2002 | Gentry, Jr. | |
| 6,389,468 B1 | 5/2002 | Muller et al. | |
| 6,427,169 B1 * | 7/2002 | Elzur | 709/224 |
| 6,453,360 B1 | 9/2002 | Muller et al. | |
| 6,510,158 B1 * | 1/2003 | Robotham et al. | 370/399 |
| 6,515,963 B1 * | 2/2003 | Bechtolsheim et al. | 370/229 |
| 6,587,463 B1 * | 7/2003 | Hebb et al. | 370/392 |
| 6,643,260 B1 * | 11/2003 | Kloth et al. | 370/235 |
| 6,658,002 B1 * | 12/2003 | Ross et al. | 370/392 |
| 6,687,247 B1 * | 2/2004 | Wilford et al. | 370/392 |
| 6,728,265 B1 | 4/2004 | Yavatkar et al. | 370/468 |
| 7,218,632 B1 * | 5/2007 | Bechtolsheim et al. | 370/389 |
| 7,227,842 B1 * | 6/2007 | Ji et al. | 370/392 |
| 7,274,698 B2 * | 9/2007 | Shankar et al. | 370/392 |
| 7,277,437 B1 * | 10/2007 | Mammen et al. | 370/392 |
| 7,289,498 B2 * | 10/2007 | Yu et al. | 370/389 |
| 7,321,554 B1 * | 1/2008 | Walsh et al. | 370/230 |
| 7,602,787 B2 * | 10/2009 | Cheriton | 370/392 |
| 2001/0005369 A1 * | 6/2001 | Kloth | 370/392 |
| 2002/0009076 A1 * | 1/2002 | Engbersen et al. | 370/389 |
| 2002/0163909 A1 * | 11/2002 | Sarkinen et al. | 370/386 |
| 2002/0191605 A1 * | 12/2002 | Lunteren et al. | 370/389 |
| 2003/0156586 A1 * | 8/2003 | Lee et al. | 370/392 |
| 2004/0037276 A1 * | 2/2004 | Henderson et al. | 370/371 |
| 2004/0039940 A1 | 2/2004 | Cox et al. | |
| 2004/0213291 A1 * | 10/2004 | Beshai et al. | 370/473 |
| 2005/0152369 A1 * | 7/2005 | Ambe et al. | 370/392 |
| 2007/0086337 A1 * | 4/2007 | Li et al. | 370/229 |

FOREIGN PATENT DOCUMENTS

| | | |
|---|---|---|
| WO | WO 00/52904 | 9/2000 |
| WO | WO 01/37489 | 5/2001 |

* cited by examiner

COMPUTER SYSTEM AND NETWORK INTERFACE SUPPORTING CLASS OF SERVICE QUEUES

REFERENCE TO RELATED APPLICATIONS

The present application is related to copending U.S. patent application Ser. No. 10/228,593 entitled COMPUTER SYSTEM AND NETWORK INTERFACE WITH HARDWARE BASED PACKET FILTERING AND CLASSIFICATION, invented by Wang, et al., filed on Aug. 27, 2002, and owned by a common assignee; and to copending U.S. patent application Ser. No. 10/228,492 entitled COMPUTER SYSTEM AND NETWORK INTERFACE WITH HARDWARE BASED RULE CHECKING FOR EMBEDDED FIREWALL, invented by Wang, et al., filed on Aug. 27, 2002, and owned by a common assignee.

BACKGROUND OF THE INVENTION

1. Field of the Invention

The present invention relates to network interface devices for interconnecting host processors with a communication network, and more particularly to the processing of specific types of packets using high speed, and/or embedded hardware at the network interface.

2. Description of Related Art

Network interface cards (NIC) are often be used for network connection between a host bus system and a network medium. NICs have integrated circuits with buffer memory for storing packets in transit. For outgoing traffic, the packets being downloaded from host memory via the host bus system go through a transmit packet data buffer and medium access control MAC unit to be transmitted onto the wire, optical fiber, or antenna (or otherwise transmitted on a network medium). For incoming traffic, the packet being received from the network medium can go through the MAC unit and a receive packet data buffer to be uploaded into host memory.

There are times that the packets can be processed on the NIC, rather than after delivery to other processing resources. For example, in embedded firewall applications, a certain field, or fields, of the packet can be inspected to determine whether further transfer of the packet should be allowed or denied.

Management of computer networks is accomplished in many systems by a central network management station which has access to end stations in the network for management functions. Several specialized control packets have been developed, which are transmitted to the end stations in support of these management functions. Some of these control packets are suitable for processing, or are designed to be processed, at the network interface, rather than after delivery to the host system on which the network interface is attached.

In one prior art system, network interface devices are configured to capture packets while the host system is not active, including "wake up" packets using resources on the interface card. See, NIC Device-Class Power management Specification, Version 1.0a, Nov. 21, 1997; Microsoft Corporation. The NIC Device-Class Power Management Specification handles the situation in which a host processor running Windows or another operating system OS wants to go to sleep, yet allow others to access any shared directories or devices it might have offered to the network. So the host OS passes the adapter a set of filters (where a filter in this example is a bit mask to specify which bytes in the packet are interesting, with a byte string for comparing with the interesting bytes) which the adapter should use. If a packet comes in that matches the filters, then the adapter wakes up, and signals power management resources in the host system.

Also, inspection of a field or fields in a packet may be required in support of logical processing of the packet for priority determinations, or other network management and system management functions.

In other examples, the packets processed on the NIC include a remote control packet allowing a management console to remotely reboot the targeted computer. Such a packet would simply be discarded by the interface processor and an action performed to reboot the computer, such as by sending a command to the host using a management interface like the SMBus (See, Smart Battery System Specifications—System Management Bus Specification, Rev. 1.0, (1995) Benchmarq Microelectronics, Inc., et al.).

In yet another example of NIC based packet processing, NIC might execute processes for which it needs to know the local internet protocol IP address of its host. This can be complicated if Dynamic Host Configuration Protocol DHCP, or another protocol for assigning dynamic IP addresses to devices on a network, is in use by which the IP address might change over time. By trapping the DHCP packets and examining them before passing them to the host, the interface card can track the changes in the IP address as they happen, and do it without adding any extra instructions to the critical code paths on the host which might increase CPU utilization or reduce performance.

In the prior art, to process data in a packet, the processing resources on the NIC have been required to read several fields in the packet in order to identify fields relevant to the processing being executed. For example, TCP/IP packets have certain fields that have a pre-specified location in the packet based on the layer two protocol. However, the IP header and TCP header have variable lengths. So in order to find the start of the TCP header, the NIC must first find the start of the IP header, and the length of the IP header to calculate the variable location of the start of the TCP header. Accordingly, packet processing requires multiple read and process cycles, which make it more difficult to keep up with the packet throughput in the NIC. Therefore, there is a chance that the buffer memory in the NIC will overflow, while processing resources on the NIC process a particular packet. If the memory overflows, packets are dropped and network performance suffers.

With 100 Megabit, Gigabit and higher wire speeds, it becomes even more difficult for the processor to inspect the packets, especially for small size packets. See, International Patent Publication No. WO01/37489 A1, entitled RECEIVE FILTERING FOR COMMUNICATIONS INTERFACE, invented by Connery, et al., published on 25 May 2001, (priority based on U.S. patent application Ser. No. 09/434,253) which describes techniques for improving performance of processor-based inspection of data packets in transit through a NIC, by reducing the number of packets that must be processing in the packet flow.

It is desirable to provide a network interface capable of processing packets, without incurring the increased costs associated with higher speed, powerful on chip, or on-board, processors. Also, it is desirable to extend the type of processes that may be executed by resources at the network interface.

SUMMARY OF THE INVENTION

The present invention provides an interface that comprises the first port on which incoming data is transmitted and received at the data transfer rate of the network, a buffer memory coupled to the first port, and a second port coupled with the buffer memory, and through which transfer of packets between the host, including a host bus system, and the buffer memory is executed. Logic is coupled to an incoming data path for the buffer memory to access data in the incoming packets as they are being stored into the buffer memory. In response to the data accessed from the incoming packets, the logic parses the incoming packet to determine and store a pointer to a location in the buffer memory at which a data field within the corresponding packet is found. Also, the incoming packet is classified according to a protocol for the packet, by the logic parsing the incoming packet. Embodiments of the invention provide for determining and storing a set of pointers for a corresponding set of locations in the buffer memory, that store key fields in the packet.

In one aspect of the invention, the logic uses a data field from the incoming packet having a pre-specified location in the packet to compute a pointer that points to a data field having a variable location in the packet. For example, for a TCP/IP packet, a set of pointers is generated indicating the start of the packet, the start of the IP header, the start of the TCP header, and the start of the data payload. Because the IP header and TCP header have variable lengths, pointers having variable locations are computed by accessing appropriate fields within the incoming packet that indicate the lengths of the headers.

In some embodiments, the buffer memory includes a transmit packet buffer to store packets in transit from the host bus system to the network medium, and a receive packet buffer to store packets in transit from the network medium to the host bus system. The packet parsing and classifying logic operates on packets traversing the interface in both directions in some embodiments.

In some environments, the logic parsing the incoming packet generates a set of pointers for corresponding packets, and stores the sets of pointers in a packet index queue. As a set of pointers for a packet progresses to the top of the packet index queue, the pointers are used, possibly in combination with offset values, to copy data fields from the packet to a packet data register. Logic is coupled to the packet data register and uses the copied data field to generate a result relevant to the processing of the packet in the buffer memory. The logic generates a result before the corresponding packet is transferred out of the buffer memory. In some embodiments of the invention, the set of pointers includes more than one pointer, and the logic operates to apply a plurality of logical functions to corresponding plurality of data fields accessed using the set of pointers from the packet.

According to one aspect of the invention, logic is coupled with the buffer memory, and stores a rule parameter. The logic accesses data fields in the packets from the buffer memory using the stored pointers and performs a logic functions based on access data fields and on the rule parameter that produces a result used to allow or denying transfer of the corresponding packet out of the interface. The rule parameter in various aspects includes rule data and rule configuration values used by the embedded logic. Therefore, an embedded firewall function is implemented at the network interface level, which is able to keep up with very high data rates of networks coupled to the interface. In addition, the embedded firewall function can be applied to packets traversing the interface in both directions, protecting from inside and outside attacks on the security of the host system.

In some embodiments, the logic at the network interface includes a packet data register coupled to the buffer memory to store accessed data fields, a rule data register to store a rule parameter, and functional circuits coupled to the packet data register in the rule data register. In one embodiment, the functional circuits include dedicated logic to perform a set of prespecified functions which are selected by the rule parameters. The prespecified functions in one embodiment include determining whether data in the packet data register is equal to data in the rule data register, whether data in the packet data register is not equal to data in the rule data register, whether data in the packet data register is greater than data in the rule data register, and whether data in the packet data register is less than data in the rule data register.

In yet another embodiments, the rule parameter includes configuration values indicating a logic operation and an action based on results of the logic operation. In one embodiment, the action specified is selected from allowing transfer of the packet, denying transfer the packet, and combining the result of the operation with results of other operations on the same packet.

In yet another embodiments, the accessed data is used for computation of packet priority for packets being received from the network. Thus, in one embodiment, the rule parameter includes an indication of packet priority in the event that the packet is allowed by the rule.

The network interface in one embodiment includes a cache memory storing a plurality of receive buffer descriptor lists. The cache memory maintains subsets of receive buffer descriptor lists composed by software in the host system according to a priority scheme. Packets are allocated to one of the lists based on packet priority determined by the embedded logic. Upload logic in the interface controls uploading of packets from the buffer memory to the host, by selecting a receive buffer descriptor from the receive buffer descriptor cache, and transferring the packet data to the identified buffers in host memory.

The invention also provides a method for managing an interface in which packets are transferred through a buffer memory between a network medium and host bus system. The method comprises parsing packets incoming to the buffer memory to generate and store pointers to locations in the buffer memory of data fields in the corresponding packets. The parsing, in some embodiments, includes using fields of data in incoming packet having pre-specified locations to compute at least one of the pointers to a field of data having a variable location in the packet. Addition, the method includes accessing data fields using the pointers prior to transferring the corresponding packets out of the buffer memory. The accessing in some embodiments includes using the pointers in combination with offset parameters. Also, embodiments include a process providing an index memory storing a set of pointers for corresponding packets in the buffer memory.

In other embodiments, the method includes determining and storing a classifier for the incoming packets, which indicates whether the stored pointer is applicable to the packet. If the classifier indicates that the pointer or set of pointers is applicable to the corresponding packet, then the process accesses the data field using the pointer.

One embodiment of the invention is a method for managing and interface in which packets are transferred to a buffer memory between the network medium in host bus system. The method includes storing one or more pointers to data fields within packets stored in the buffer memory, and associating one or more pointers with the corresponding packets. Rule parameters are stored and used for applying a rule using the one or more pointers to corresponding packets. Data fields are accessed using the corresponding pointers. The rule is applied using the accessed data fields to produce a result used to allow or deny transfer of the corresponding packet to one of the network medium and the host bus system to provide an embedded firewall.

The embedded firewall can be used to apply network security to host computers. Packet parsing and classifying can be performed while the downloaded packet is being written into a transmit packet data buffer or a received packet is being written into receive packet data buffer. Upon the completion of the packet parsing, the packet start location, IP header start location, TCP header start location and protocol type can be stored to allow any offset within a packet to be accessed. The fetched data can be used to compare with a predefined rule data and determine whether the packet should be allowed or denied along with its priority. On transmit side, the allowed packet will be transmitted onto the wire. On the receive side, the allowed packet will be uploaded into host memory based on its priority.

In one embodiment used alone or in combination with the embedded firewall function, rules are applied for assigning a priority for upload of a packet being received from the network.

In another embodiment, receive buffer descriptors are stored in a receive buffer descriptor cache memory on the network interface. According to the priority determined by applying rules using embedded logic, receive buffer descriptors for corresponding packets are assigned to one of a plurality of receive buffer descriptor lists in the cache memory. Each of the receive buffer descriptor lists has a priority utilized by upload logic to determine the sequence for uploading packets in the receive packet data buffer. A host driver program operates in conjunction with the network interface, and sets up corresponding receive buffer descriptor lists in host memory.

In some embodiments of the invention, the accessed data field is applied to embedded logic, on the same integrated circuit as the buffer memory, which operates fast enough to keep up with a data rate of the network. The speed of the embedded logic is improved because the process of computing pointers for data fields in the packets is automated, and occurs in advance of the execution of the embedded logic function. In some embodiments, the embedded logic is dedicated logic, as opposed to programmable logic, that performs according to an algorithm controlled by hardwired circuitry, relieving the logic of the need to fetch instructions during the performance of the functional logic using the accessed data fields.

The invention also provides a computer system comprising a host CPU, a host bus system and a network interface coupled to a high-speed data network, in which packet parsing and classification are executed at the network interface level, and which is configured to operate with a data rate of 100 megabits/second or higher. Particularly, the invention enables operation of computer systems with sophisticated functional logic at the network interface level operating with for example gigabit and 10 gigabit per second data speeds. Furthermore, the first port, second port, buffer memory, parsing and classifying logic, and embedded functional logic are implemented on a single integrated circuit in some preferred embodiments.

Other aspects and advantages of the present invention will be seen on review of the figures, the detailed description and the claims, which follow.

DETAILED DESCRIPTION

Figure 1:
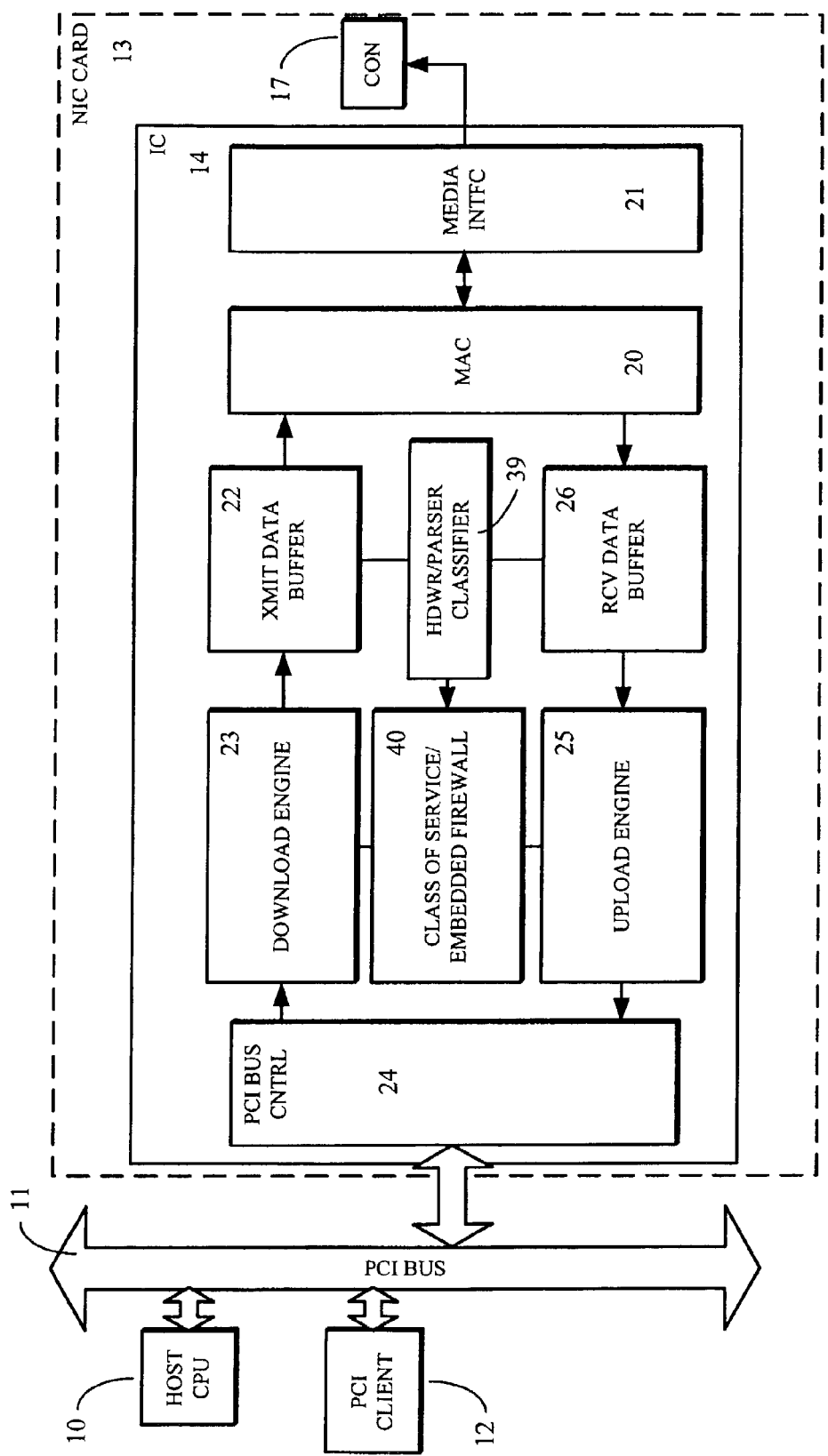
FIG. 1 is a simplified block diagram of a network interface including features of the present invention.

FIG. 1 provides a basic diagram of a data processing system having a host CPU 10 coupled to a bus system 11, such as a PCI bus. The bus 11 interconnects a plurality of PCI clients, including client 12 and the network interface card 13 shown with expanded functional blocks. The network interface card 13 includes an application specific integrated circuit IC 14. The IC 14 includes network interface functions for an Ethernet interface (in 100 Megabit, Gigabit, or faster formats for example) in this embodiment. Other embodiments provide interfaces to other types of the network protocols, such as Infiniband. In addition to the IC 14, other components are interconnected by and supported by the circuit board of the network interface card 13. For example, a BIOS ROM (not shown), an EEPROM (not shown) and a medium connector 17 are on the circuit board. The network interface may also be implemented on a motherboard or other mounting arrangement. Also, the integrated circuit may be a system-on-a-chip device including the network interface logic, and other resources including an host processor.

The data processing system also includes a system management bus (not shown) coupled to the various components, including a host CPU 10, the PCI client 12, and the network interface chip 14. A system management bus master circuit (not shown) is included which manages the transmission messages on the system management bus. The system management system includes a system monitor, which monitors events relevant to system and power management. For example, the system monitor monitors fan speed, power consumption, temperature, battery level, and the like. Upon certain events indicated by the monitored characteristics of the system, alert signals are issued on the system management bus. Power management logic (not shown) is included to signal the host to enter a sleep mode, or other state in which the operating system is inactive, or in a reduced activity mode.

The system management bus may comprise, for example, a bus complaint with a standard system management bus (SM-Bus) specification. Each of the components coupled with the system management bus, includes a system management bus slave logic block. Thus, the network interface chip 14 includes SMB slave logic, which is coupled to the system management bus.

The IC 14 includes a medium access controller (MAC) 20 coupled to media interface circuitry 21 connecting to the connector 17. The medium access controller 20 is also coupled to buffer memory on the IC 14, including a transmit FIFO buffer 22 which is driven by a download engine 23 on the IC 14. The download engine 23 is coupled to a PCI bus controller 24. The PCI bus controller 24 is also coupled to an upload engine 25. The upload engine 25 is coupled to a receive FIFO 26 which is connected to the medium access controller 20. Thus, the illustration of the IC 14 includes basic elements of a network interface controller chip.

The network interface is used to connect to the network and provide communication paths to pass messages to remote systems. The network interface operates in an OS-present state normally through the host bus 11. On the transmit side, the packets can be downloaded through host bus system 11 to the transmit packet buffer 22. The packets are forwarded to the medium access controller (MAC) 20, which converts the packets to conform with the IEEE 802.3 Data Link layer protocol. These packets will finally go through the physical layer interface 21 and be transmitted onto the wire (or other type of media, including wireless media) via an connector 17. On the receive side, the packets being received from the wire will go through the physical layer interface 21 and the MAC 20 before getting written into receive packet buffer 26. These packets will then be uploaded through host bus to host memory. The host bus interface 24 on the NIC 13 in this example consists of PCI slave and PCI master. The function of the PCI slave is to determine whether to accept a transaction initiated from the PCI Host. This transaction will be used to initialize NICs' registers (including rule registers described below), check status, handle interrupts and control data movement. The function of the PCI master is to download the packets to be transmitted and upload the packets being received through the PCI Bus. Each packet consists of multiple fragments and each fragment can be located in different chunks (often referred to as buffers) of host memory. Data downloading starts with fetching the address and the length information of each fragment, usually from a packet descriptor composed by host software, followed by downloading the packet data from host memory to the transmit buffer 22. This process repeats until all the fragments within a packet are downloaded. In some systems, multiple transmit packet descriptors are created, and stored in a list, to facilitate transmission of multiple packets. In these systems, the downloading process continues according to algorithms used for controlling the descriptor lists.

Data uploading is handled the same way as data downloading except the direction of the data is reversed, with data flowing through the receive buffer 26 to the host bus 11. Control of uploading is also managed using descriptors of chunks of memory accessible using the host bus system, that are allocated for receiving packets by host software. Descriptors for received packets can be stored on the NIC 13, and used as needed by the upload engine 25. In some systems, multiple receive packet descriptors are created, and stored in a list, to facilitate reception and uploading of multiple packets. In these systems, the uploading process continues according to algorithms used for controlling the descriptor lists, as long as packets are available for uploading from the receive data buffer 26.

According to the present invention, the network interface chip 14 also includes a hardware-based parser/classifier 39. The parser/classifier 39 is coupled to the transmit data buffer 22 and the receive data buffer 26, preferably at the incoming data paths for both buffers. Also, the parser/classifier 39 is coupled to resources 40, which utilize the parser/classifier 39 to facilitate operations on packets in transit through the NIC 13. In one embodiment, the resources 40 comprise an embedded firewall. In another embodiment, the resources 40 comprise logic to enforce class of service queues for received packets. In other embodiments, other functions are performed.

The parser/classifier 39 according to one embodiment of the present invention uses hardware to inspect packet headers while the packets are being written into buffer memory on the NIC 13. As it parses the incoming packets, it tries to compute a set of pointers to locations in the buffer memory of data fields within the packet, such as the packet start data field, the IP header start data field, the TCP header start data field and the data payload start data field. The computed set of pointers can be used as an index to access locations within a packet, without requiring multiple reads of data from the buffer memory. In the preferred system, this set of pointers is stored into a Packet Index Queue in memory on the NIC, across data paths in parallel with the input path to the buffer memory, essentially at the same time the packet is being written into the receive or transmit data buffers, and at least before the packet is transferred out of the receive or transmit data buffers.

While the packet is being transferred out, a predefined start_type parameter selects a particular pointer in the set of pointers. The selected pointer is used with an offset value, provided by logic on the NIC, to access a selected data location within a packet, which can then be used by processing logic to determine an action for the packet.

Since, protocols may allow header lengths to vary, as in TCP/IP, the prior art approach of using a processor to inspect the packet, requires the processor to read the packet header multiple times, and perform all the necessary computation to identify the protocol type, header locations, and payload starting locations for the packet. The method described in this invention can have all the information available before processing begins, preferably through hardware, by performing parsing and classification as the packet is being written into the receive or transmit data buffers.

Features of the hardware based packet parser and classifier include, but are not limited to the following:

Allows packets to be parsed while being written into Packet Buffer on both transmit and receive directions.

Allows locations of key fields, such as packet start location, IP header start location, TCP header start location and data start location, to be identified and stored into a Packet Index Queue before the complete packet is being written into Packet Buffer.

Allows start locations to be identified at once prior to completing the packet write into Packet Buffer, even while the IP header and TCP header have various lengths.

A Packet Index Queue can store various start locations for multiple packets while they are being written into Packet Buffer. While the current packet is being read out for rule check, the subsequent packets can be parsed and stored into Packet Index Queue for further use.

Packet Protocol can be identified and stored which can be used to determine whether hardware will perform the required rule check function or processor will be used to handle non-timing critical tasks for management or control packets.

While the packet information is being read out of Packet Index Queue, it can be used to determine which start location (packet, IP header, TCP header or data) of the stored packet can be used for rule check or priority assignement.

The start location of the packet can be indexed by offset to select any packet entry in Packet Buffer to be used for rule check or priority assignement.

Only one memory (Packet Buffer) access is needed per rule to optimize performance for high-speed wire rate support.

Since only one memory access is needed, multiple rules can be applied to a single packet and still be able to achieve Giga-bit wire speed.

In one aspect of the invention, the resources using the parser/classifier comprise an embedded firewall. Thus, the present invention also provides an innovative scheme to perform rule check functions for embedded firewall applications through hardware. With a hardware-based approach, multiple rules can be applied to an incoming or outgoing packet at Gigabit speeds. System performance can be maximized with lower cost to produce embedded firewall product.

Features of a hardware based rule check for embedded firewall applications, according to the present invention, include but are not limited to the following:

Any offset within a packet can be used for rule check.

Any range can be specified through Rule Mask Register by masking the lower bits for rule check.

"Equal", "Not Equal", "Greater than" or "Less than" operation modes can be specified for rule check.

"Allow", "Deny", or "AND with the next rule" can be specified as the required action upon rule match.

Match on any one of a set of rules can be used to take the required action (Allow or Deny).

Multiple rules match through "AND with the next rule" option can be used to take the required action (Allow or Deny).

For each rule, only one packet buffer access is required to fetch the data from the offset specified through the particular local rule register set.

Rule check can be performed on download/transmit path, which can filter and control the outgoing traffic to protect inside attack.

Rule check can also be performed on receive/upload path, which can filter and control the incoming traffic to protect outside attack.

Upon rule match, if "Allow" is specified, the outgoing traffic can be transmitted onto the wire and the incoming traffic can be uploaded into host memory.

Upon rule match, if 'Deny" is specified, the packet can be discarded from the packet buffer to disallow the outgoing traffic to be transmitted onto the wire and to disallow incoming traffic to be uploaded into host memory.

Upon rule match, if "AND with next rule" is specified, the subsequent rules can be evaluated prior to taking any action.

If all the ANDed rules are matched with "Allow" specified as the needed action, the priority level specified in the last rule can be used as the order to upload the received packet to host memory.

No need for processor to read the packet header each time a rule is being evaluated.

Giga-bit wire speed for embedded firewall applications can be achieved even with large amount of rules to be evaluated.

In one aspect of the invention, the resources using the parser/classifier logic providing an innovative scheme to perform management of packet priority. According to this aspect of the invention, priority traffic can be implemented on the NIC to provide class of service support. Multiple buffer descriptor rings can be used to support this feature. On transmit side, management of class of service is more straightforward since NIC driver software in the host system, knows the priority of each packet. Multiple Transmit Buffer Descriptor (TBD) rings can be constructed in host memory using the NIC driver with different priority levels assigned to each of them. Thus, in some embodiments, the TBDs are set up in TBD rings by the NIC driver in advance based on packet priority level. The TBDs can then be transferred to a corresponding TBD cache on the NIC. NIC hardware will fetch the TBDs from its TBD cache based on the priority level, and use the transmit buffer address and length information stored in the entry of the TBD cache to perform the data download DMA operation from host memory to the transmit packet data buffer.

On receive side, class of service management is more complicated since the NIC driver in the host is not aware the priority of the received packets. Thus the host software cannot assign a priority for upload of received packets. The present invention provides a method to use the packet parser/classifier to determine whether the current packet being received should be allowed or denied. If the packet is to be denied, it will be discarded from receive packet data buffer. Otherwise, a receive buffer descriptor in a RBD cache is allocated to the allowed packet. Multiple RBD lists are established in the cache, and the allocation of an allowed packet to one of the RDB lists is based on a priority assignment generated by the logic on the NIC. The Upload Engine will follow the priority of the RBD lists to retrieve the highest priority RDB, and use the information in the RBD to upload the received packet into host memory.

Features of embodiments of a hardware based rule check for management of class of service for received packets, according to the present invention, include but are not limited to the following:

Packet parsing logic can be used to parse the packet start, IP header start, TCP header start and data start locations along with the protocol type. This information will be stored into Packet Index Queue.

Rule check logic can be used to evaluate the pre-defined rules and compare with the data field at any offset of the packet. A match found will cause the packet to be denied or allowed.

Priority level will be used to specify the packet priority for it to be uploaded into host memory if the packet is to be allowed after rule match.

Packet priority can be determined through rule match with IP header Type of Service (TOS) field, or it can be determined through rule match on any data value within any packet offset. The priority register can be used to specify the packet priority upon rule match.

Upon completing rule match, Allow, Deny and Priority from rule check as well as packet address and packet length from Packet Index Queue for the received packet will be stored into a Priority Queue.

Priority Queue Fetch Engine will fetch each stored entry from Priority Queue. If the packet is to be denied, it will be discarded from receive packet data buffer. Otherwise, the packet address and length will be placed into the corresponding RBD cache entry selected through its priority level.

Multiple RBD rings (1~n) can be constructed in host memory. Each RBD ring consists of multiple Receive Buffer Descriptors (RBD). Each RBD will be used to specify the address and length of the receive buffer in host memory for the received packet to be uploaded.

Each RBD ring is assigned a priority level (e.g., 1-highest, n-lowest) which can be used for the received packet to be uploaded into host memory based on its priority.

Each RBD ring has its associated RBD cache in NIC memory. These caches can be used to prefetch the RBDs from RBD rings from host memory, which can then be used by Upload DMA Engine to upload the received packets from NICs receive packet data buffer into host memory.

Each entry in RBD cache needs to be updated with the received packet's address and length while the received packet information is fetched from Priority Queue.

Based on the priority of the packet, the entry pointed by cache_cur_ptr within the corresponding RBD cache will be updated accordingly.

Upload Engine will follow the priority of the RBD cache to upload the packet from NIC's receive packet data buffer into host memory. Packet address and packet length stored in each entry of the RBD cache can be used by Upload DMA Engine to access the received packet from receive packet data buffer; Host receive buffer address stored in the entry of the RBD cache can be used by Upload DMA Engine to locate the receive buffer in host memory to upload the received packet.

Figure 2:
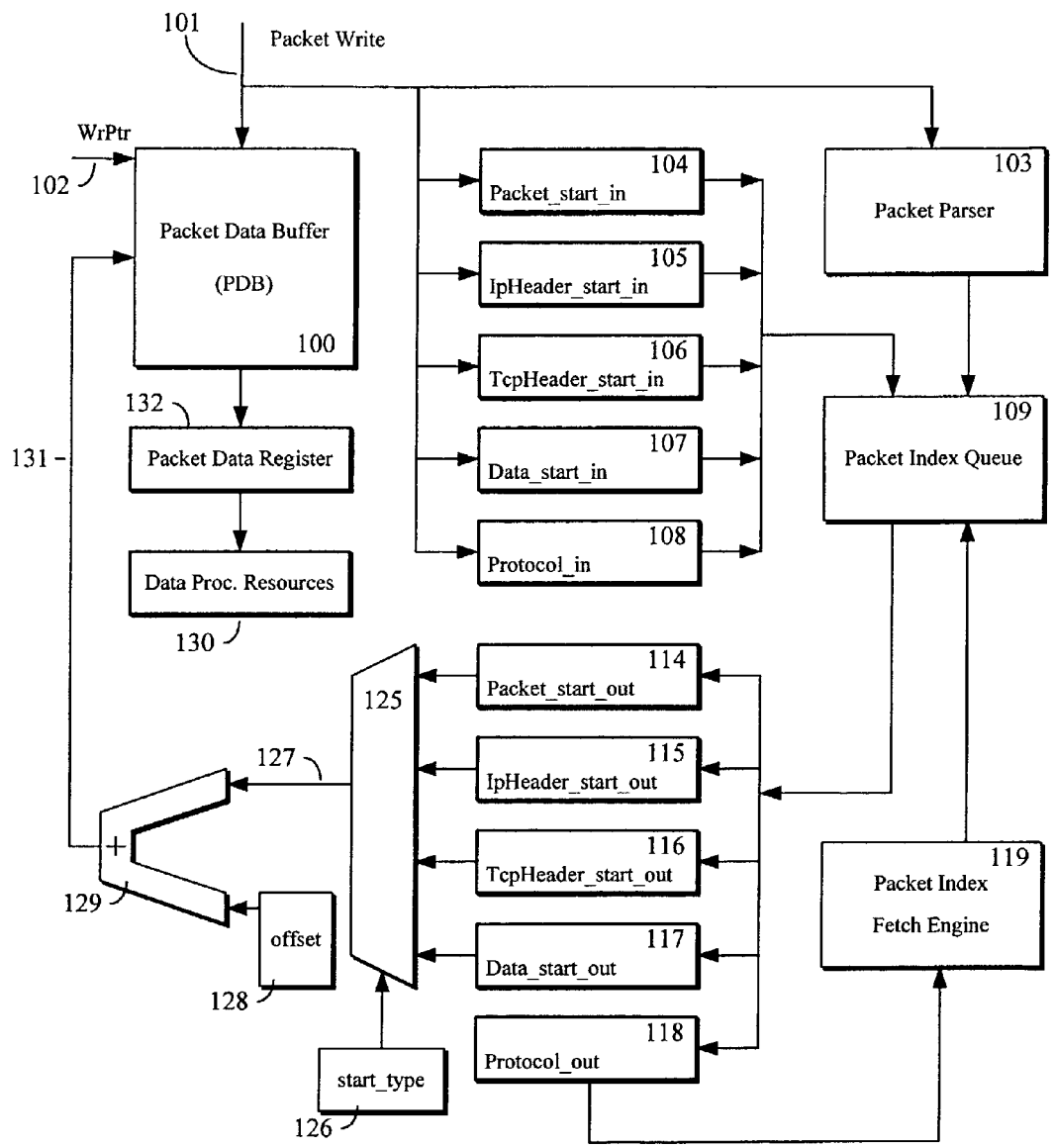
FIG. 2 is a simplified diagram of the packet parsing and classifying logic according to the present invention.

A more detailed description of the packet parser/classifier 39 is provided with reference to FIG. 2. FIG. 2 shows a simplified block diagram of the packet parser/classifier 39 with buffer memory 100, that corresponds to one or both of the receive and transmit packet buffers 26, 22 of FIG. 1. Packets are written to the buffer memory 100, large enough to store more than one packet of typical size for the particular network, from an incoming data path 101. The write pointer WrPtr 102 specifies an address for each byte as it is written to the buffer memory 100. In parallel with the buffer memory 100, the incoming data path 101 is coupled to packet parser logic 103, and to a plurality of incoming registers 104-108. In this example, the plurality of incoming registers 104-108 is used to store pointers used to locate key fields in a TCP/IP protocol packet (packet start, IP header start, TCP header start, data payload start), and to store a value (protocol) indicating whether the incoming packet is compliant with the TCP/IP protocol.

The incoming registers 104-108 and the packet parser logic 103 are coupled to memory 109 can be used as a packet index queue. The memory 109 is coupled to a plurality of outgoing registers 114-118, which correspond to the incoming registers 104-108. Also, a packet index fetch engine 119 is coupled to the memory 109 and to the register 118. The register 118 holds a code indicating the protocol of the current packet, that is used by the packet fetch engine 119. The other registers in the plurality of outgoing registers 114-117 are coupled to a multiplexer 125. A parameter start_type 126 is applied by data processing resources 130 to control the multiplexer 125 to select one of the outgoing registers to supply an output on line 127. An offset value 128 is applied by data processing resources 130 which is added in logic 129 to the value on line 127. The output of the logic 129 is an address on line 131 used for a read of a location in the buffer memory 100. The data field at the location addressed is provided to a packet data register 132, which is coupled to the data processing resources 130. The data processing resources 130 produce results that can be used prior to transferring a packet out of the buffer memory 100, or prior to transferring the packet out of the interface, as discussed above.

This example illustrates a structure that is used to parse packets and store key pointers for a single protocol (TCP/IP), and to indicate whether the current packet is compliant with that protocol. Other embodiments extend the capabilities to a plurality of network protocols.

Figure 3:
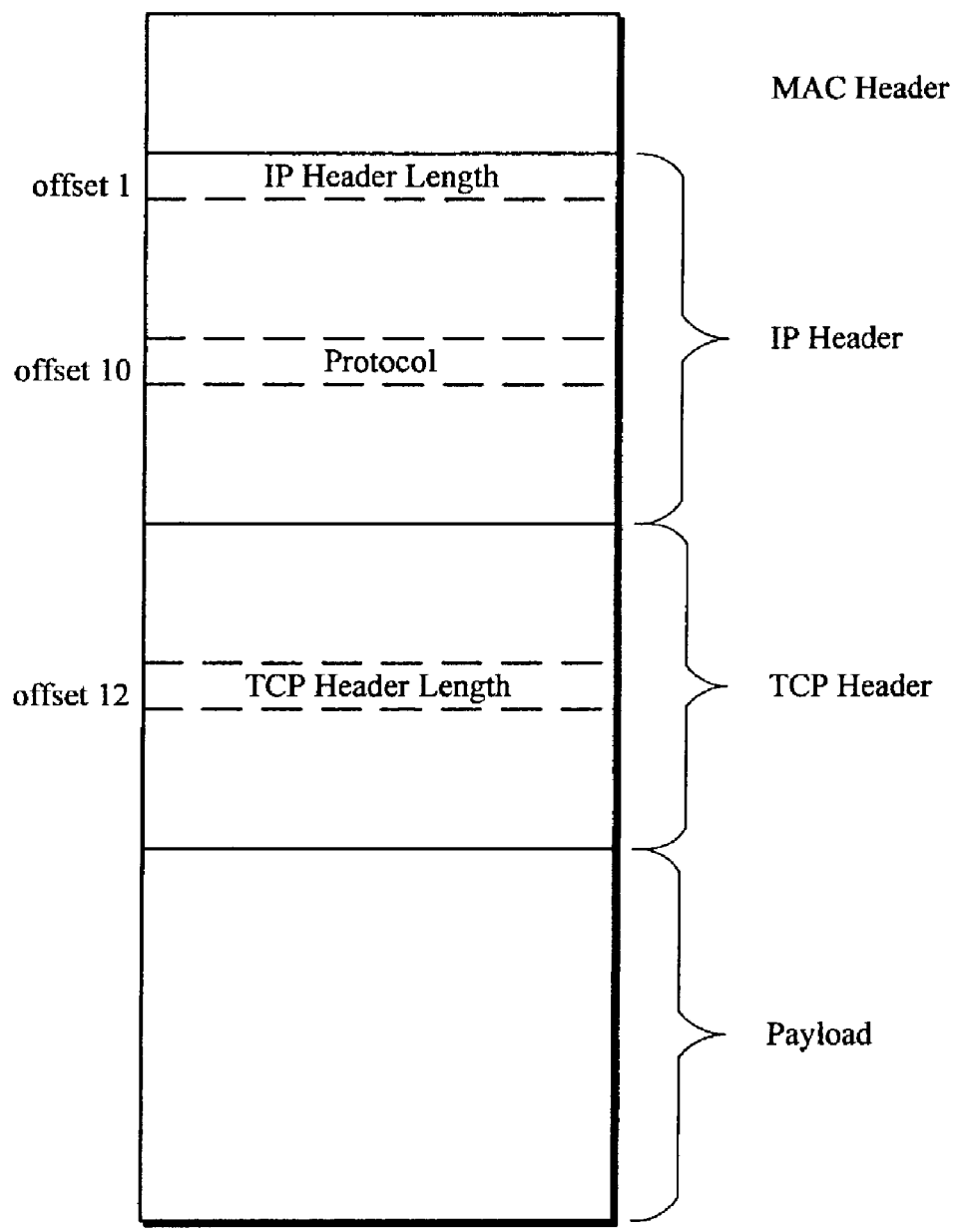
FIG. 3 illustrates the typical TCP/IP packet format, and key fields identified according to an embodiment of the present invention.

FIG. 3 shows the basic structure of a TCP/IP packet format with key fields identified. The offset 0 corresponds with the packet start data field. The first data field after the end of the MAC header (after offset 13) corresponds with the IP header start location, and stores a parameter in the lower four bits, indicating the IP header length. The TCP header start location is equal to the IP header start location plus the IP header length. The TCP header length is found at offset 12 after the beginning of the TCP header. The data payload start location is found at the TCP header start location plus the TCP header length value. The IP header length and TCP header length values are variable, and therefore cannot be determined without inspecting each packet. Using pointers to the packet start location, the IP header start location, the TCP header start location, and the data payload start location, essentially any data field in the packet can be located without further analysis of parameters within the packet headers.

Figure 4:
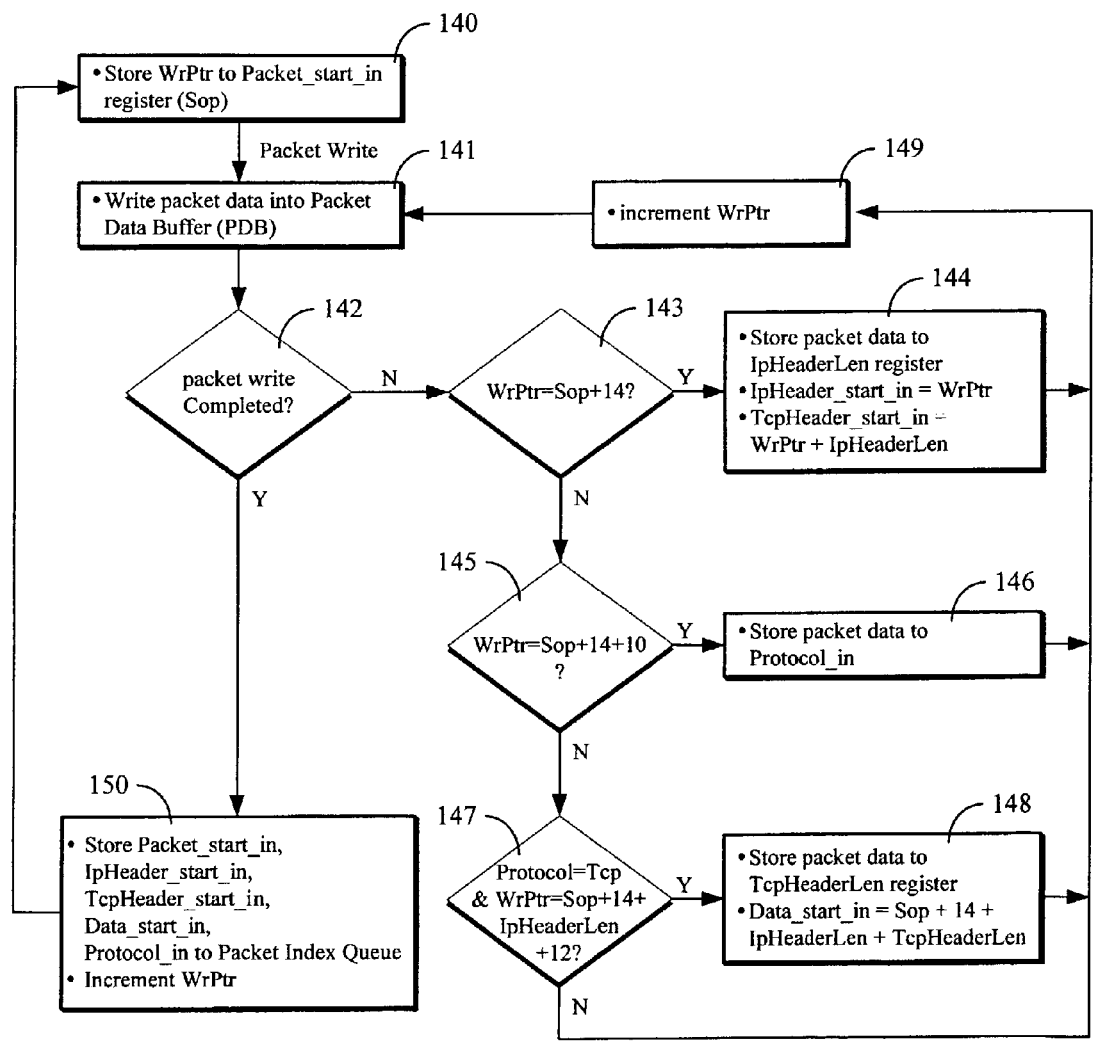
FIG. 4 illustrates the packet parsing and classifying process according to one embodiment of the invention.

Thus, the packet parser/classifier is used to parse the packet while it is being written into Packet Data Buffer (PDB). The parsed packet can be either a downloaded packet to be transmitted onto the wire or a received packet to be uploaded into host memory. After packet write start condition is detected, packet parser logic as shown in FIG. 4, will be activated to write the current packet write pointer (WrPtr) into Packet_start_in register 104, which indicates start of packet (Sop) condition (block 140). The packet data is written into the packet data buffer (block 141). After each data byte is written into a PDB, packet write complete status will be checked (block 142). If the packet has not been completely written into PDB at block 142, the packet write will continue with WrPtr incremented each time a packet data is being written into the PDB. The process checks for the beginning of the IP header at block 143. As soon as 14 bytes of MAC header has been written into PDB, the process branches to block 144, where the WrPtr will be equal to Sop+14, which is the starting location of the IP header. The lower 4 bits of data in this location will be loaded into an IpHeaderLen register, and the current WrPtr will be loaded into IpHeader_start_in register 105, which can be used as the base address of the IP header and allow any offset indexed with this header to be accessed properly. Finally, TCP header start address can be computed through "WrPtr+IpHeaderLen", which can be loaded into TcpHeader_start_in register (block 144).

After IP and TCP header starting locations have been identified, packet write to PDB will continue on until it reaches IP header offset 10*d* (block 145). The data in this header offset field will be loaded into, or used to set a code in, Protocol_in register 108 which can be used to identify the protocol type of the packet (block 146).

Packet write will proceed until all the IP header data has been written into PDB. Writing of the TCP header to the PDB will follow until offset 12*d* is reached (block 147). The TCP header length stored in this field will be used to compute the starting location for packet data through "Sop+14+IpHeaderLen+TcpHeaderLen", which will be loaded into Data_start_in register 107 (block 148).

The process loops from blocks 144, 146 and 148 to block 149 where the WrPtr will be incremented by one, and thereby pointed to the next packet data location until all the packet data are written into PDB (block 142). Protocol_in, Packet_start_in, IpHeader_start_in, TcpHeader_start_in and Data_start_in registers will be stored into the Packet Index Queue, which can then be used with the pre-specified start type and offset to retrieve the packet data from the PDB for various application needs (block 150). At this point, the process is ready to receive a following packet.

The Packet Data Buffer (PDB) can be used to store the downloaded packet for transmitting onto the wire or received packet for uploading into host memory. While the packet data is being written into PDB, the packet parser/classifier will be invoked to perform packet parsing in parallel and store the related information into a Packet Index Queue in memory 109. This information will allow the packet start, IP header start, TCP header start and data start locations to be identified in Packet Data Buffer for each stored packet, which can then be used to access any offset within a packet for rule check or priority assignment.

The Packet Index Queue in memory 109 is used to store packet protocol type, packet start location, IP header start location, TCP header start location and data start location for associated packets in the PDB. This information can be obtained through parsing the packet header while it is being written into PDB, which can then be used by the Packet Index Fetch Engine 119 to determine where the packet starts along with the offset to retrieve the packet data.

Figure 5:
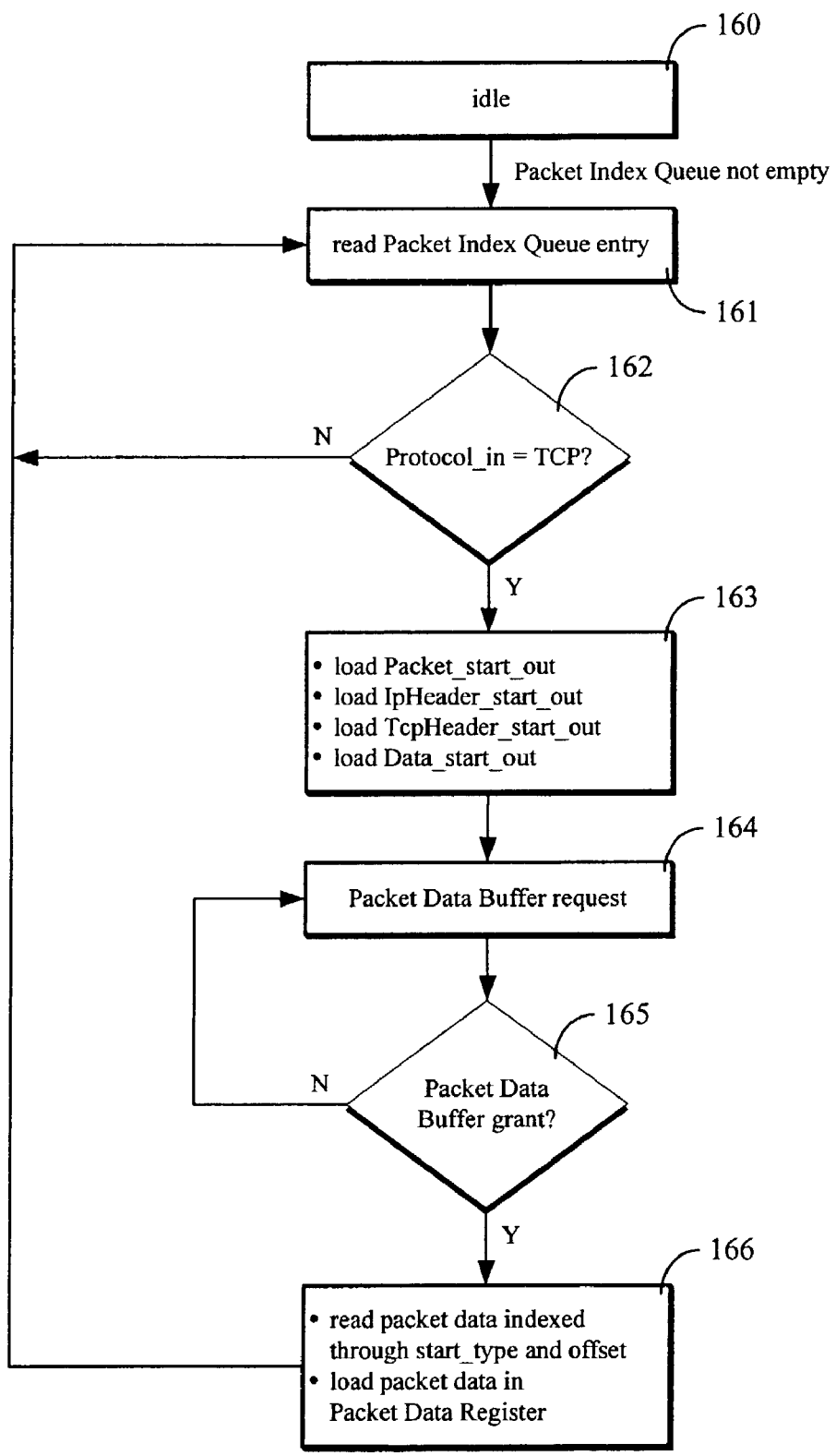
FIG. 5 illustrates the packet index fetch process according to one embodiment of the invention.

The Packet Index Fetch Engine 119 can be used to fetch the stored packet information from Packet Index Queue in the memory 109. A flow diagram for the packet fetch engine is shown in FIG. 5. The process begins in an idle state (block 160). Whenever the Packet Index Queue is not empty, packet index fetch will be initiated (block 161). The top entry will be read out from Packet Index Queue to verify protocol type (block 162). If the packet is not a TCP packet, control will go back to IDLE (block 160) since there is no further need to perform packet inspection for this single protocol embodiment. Otherwise, packet start, IP header start, TCP header start and data start locations will be loaded to Packet_start_out, IpHeader_start_out, TcpHeader_start out and Data_start_out registers 114-117. The start-type value in register 126 will be used to select the right start location, which will then be added with the offset field from register 128 to generate the address for accessing a location of a data field in the PDB. After the access to the packet data buffer is granted, the packet data from the specific location within PDB will be loaded into Packet Data Register 132 for processing using the data processing resources 130.

Figure 6A:
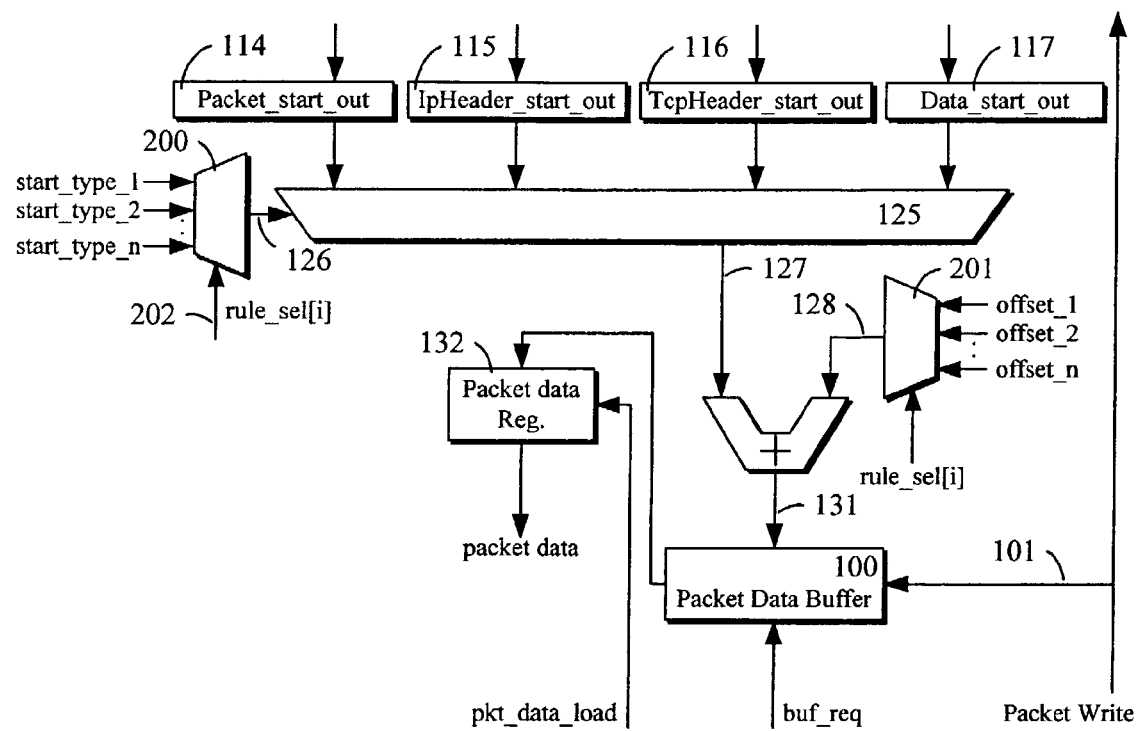
FIG. 6A illustrates an extension of the packet parsing and classifying logic supporting multiple logic functions according to one embodiment of the invention.
Figure 6B:
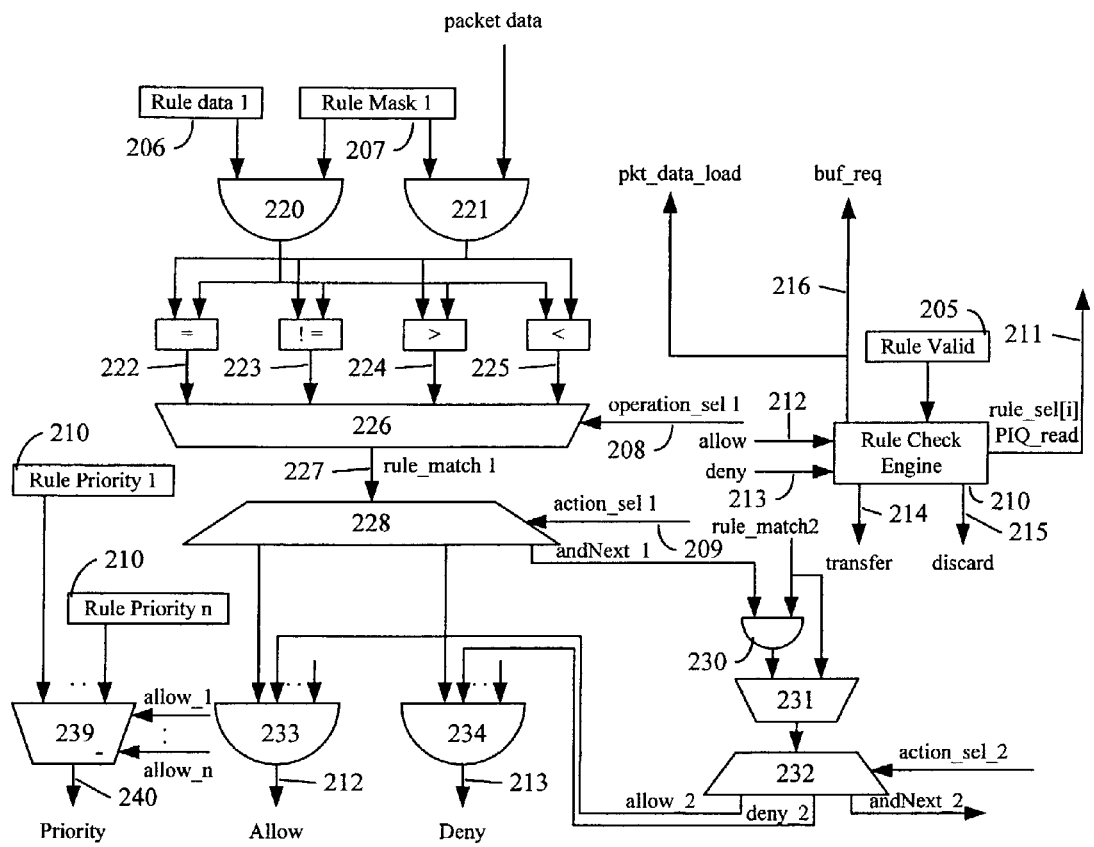
FIG. 6B is a simplified block diagram of in embedded firewall and priority engine according to one embodiment of the invention.

FIG. 6A illustrates an extension of the packet parser/classifier of FIG. 2 for the purposes of specifying a plurality of offset values 128 and a plurality of start_type values 126. Components labeled with the same reference numerals as used in FIG. 2 are not re-described. To extend the parser/classifier to handle multiple offset and start types, a multiplexer 200 is added which is coupled to a plurality of rule specific registers storing a start_type value (start_type_1, start_type_2, ... start_type_n) for each of a plurality of logic functions. Also, a multiplexer 201 is provided which is coupled to a plurality of rule specific registers storing an offset value (offset_1, offset_2, ... offset_n). A rule select parameter rule_sel [i] 202 is applied to the multiplexers 200, 201 to select an appropriate rule specific value for a current logic functions being executed by the data processing resources. The extension of the packet parser/classifier shown in FIG. 6A is adapted for use with an embedded firewall and class of service manager, which applies a plurality of rules. A basic diagram of the data processing resources that support the embedded firewall are shown in FIG. 6B.

According to an example embodiment which is described with reference to FIG. 6B, the embedded firewall includes a global rule valid register 205, and a plurality of rule specific registers.

In this example, there is only one global rule register among all the supported rules. One example format for the rule valid register 205. Each bit of the rule valid register 205 can be used to enable rule check functions for a specific rule. The number of bits set in the rule valid register 205 indicates the number of enabled rules. The rules are enabled for example, in ascending order (from lower bits to higher bits of the rule valid register). Each rule is serviced in the order indicated in the rule valid register, until a zero is detected, indicating that all the rules have been evaluated for the current packet.

Each rule consists of a set of rule specific registers in this example which can be used to perform rule check functions. Rule Data Register 206 specifies the data to be used for rule check. This data can be used to compare against data at any offset within a packet. All the possible offset can be indexed from the beginning of the packet, the beginning of the IP header, the beginning of the TCP header and the beginning of the payload. For example, if we want to allow the access of a particular TCP source port, we can specify the port number in rule data register to be used for comparison.

Rule Mask Register 207 can be used to mask off any number of the lower bits between Rule Data Register and Packet Data Register. While Rule Data Register is used to specify the data to be used for rule check, Packet Data Register can be loaded from any offset within a packet. The start location is selected through start_type, it will be indexed through the offset field defined in Rule Config Register to access any offset within a packet. If certain destination IP address ranges are used to determine whether the packet should be allowed or denied, the lower bits in Rule Mask Register can be set to "0" which will mask off the lower bits in Rule Data Register and Packet Data Register to be used for comparison.

Rule Config Register (not shown) can be used to set up the operation mode for rule check, determine the required action upon rule match, select the type of the offset start location and specify the offset value which can be used as an index to access any data location within a packet. In one example, the Rule Config Register comprises bits [17:0], defined as follows:

- bit[1:0]: operation_sel_n 208 are used for selecting the desired operation to be performed for rule check. 00-equal; 01-not equal; 10-greater than; 11-less than.
- bit[3:2]: action_sel_n 209 can be used to select the action to be taken upon rule match. 00-allow; 01-deny; 10-AND next rule; 11-NA.
- bit[5:4]: start_type_n (see FIG. 6A) can be used to specify the starting location of the offset to be used for rule check. 00-beginning of the packet; 01-beginning of the IP header; 10-beginning of the TCP header; 11-beginning of the data payload.
- bit[17:6]: offset_n (see FIG. 6A) are used to specify the offset to be indexed from the starting location defined in bit[5:4]. The data being fetched will be loaded into Packet Data Register which can be used to compare with the data specified in Rule Data Register for rule check.

A rule priority register 210 can be used to specify the priority level of each rule (rule_priority_1, ... rule_priority_n). IN one embodiment, if a rule match is found for a received packet and the packet is to be allowed, it will be uploaded into host memory based on the priority setting. For multiple rules with "AND" condition specified, the priority level set in the last rule can be used as the order for it to be uploaded into host memory.

FIG. 6B illustrates the basic configuration of dedicated logic used for executing an embedded firewall using the global and rule specific (local) rule registers described above. A rule check engine 210 manages the rule checking. The rule check engine 210 produces a packet index queue read command PIQ_read and a rule select command rule_sel [i] on line 211 which is supplied to the packet parser/classifier of FIG. 6A. The inputs to the rule check engine 210 include the rule valid register 205 and the allow or deny signals on lines 212 and 213 respectively, produced by the application of the rules as described below. In addition, the rule check engine 210 issues the signal pkt_data_load on line 216 to control loading of a selected data field from the packet buffer 100 into the packet data register 132. The results of operation of the rule check engine 210 include a command on line 214 to allow transfer of the packet out of the data buffer 100, or a command on line 215 to discard the packet.

In this example, dedicated hardware is provided for each of the supported rules which includes generally a rule match block and an action select block. The dedicated hardware is controlled by the global and local rule registers without additional instructions.

The rule match block is shown for a single rule in FIG. 6B. The rule match block includes the rule data register 206, the rule mask register 207, gates 220 and 221 which are coupled to the rule data register 206 and packet data register 132, respectively, and apply the rule mask from the rule mask register 207. The masked outputs from the gates 220 and 221 are applied to operational logic blocks to 222-225, which perform respective logic functions. In this example, the logic functions include equal to (block 222), not equal to (block 223), greater than (block 224) or less than (block 225). The output set of the logic blocks 222-225 are applied to a multiplexer 226, which is controlled by the operation_sel_1 parameter from the local rule register on line 208. The output of the multiplexer 226 is a signal on line 227, indicating whether the packet data matches the rule (rule_match_1). A plurality of rule match blocks are cascaded on the chip for rules 2 to n, and generate respective outputs, rule_match_2 to rule_match_n, as each valid rule is applied in sequence under control of the rule check engine 210.

Action select blocks are illustrated for rule 1 and rule 2 in FIG. 6B. Additional action select blocks are provided for each of the rules supported by the rule check engine 210. The action select block for the first rule includes selector 228, which is responsive to the rule specific register value action_sel_1 on line 209 to generate a control signal allow_1, a control signal deny_1, or a control signal and Next_1.

The action select block for rule 2 includes gate 230 that receives the control signal and Next_1 from the previous action select block, and receives the output rule_match_2 from the rule match block (not shown) for rule 2. The output of the gate 230 and the rule_match_2 signal are applied to a multiplexer 231. The multiplexer 231 is controlled by the and Next_1 signal to select either the output of the rule match logic for rule 2, or the logic AND of the and Next_1 signal with the rule_match_2 signal as output to the selector 232. The selector 232 is controlled by the action_sel_2 signal from the local register for rule 2 to select allow (allow_2), deny (deny_2), or and Next2 as results of a rule match at this level of the rule check engine. The and Next_2 signal is supplied and cascaded to the next action select block in the rule check logic. The allow and deny signals are applied to respective OR gates 233, 234. The outputs of the OR gates 233,234 are applied on lines 212 and 213, respectively, to the rule check engine 210.

The respective allow signals (allow_1, ... allow_n) are also supplied to a priority selector 240. The inputs to the priority selector 240 include the local priority registers (rule priority 1, ... rule priority n). The output of the selector 240 is a priority signal utilized for management of class of service processes described in more detail below.

Figure 7:
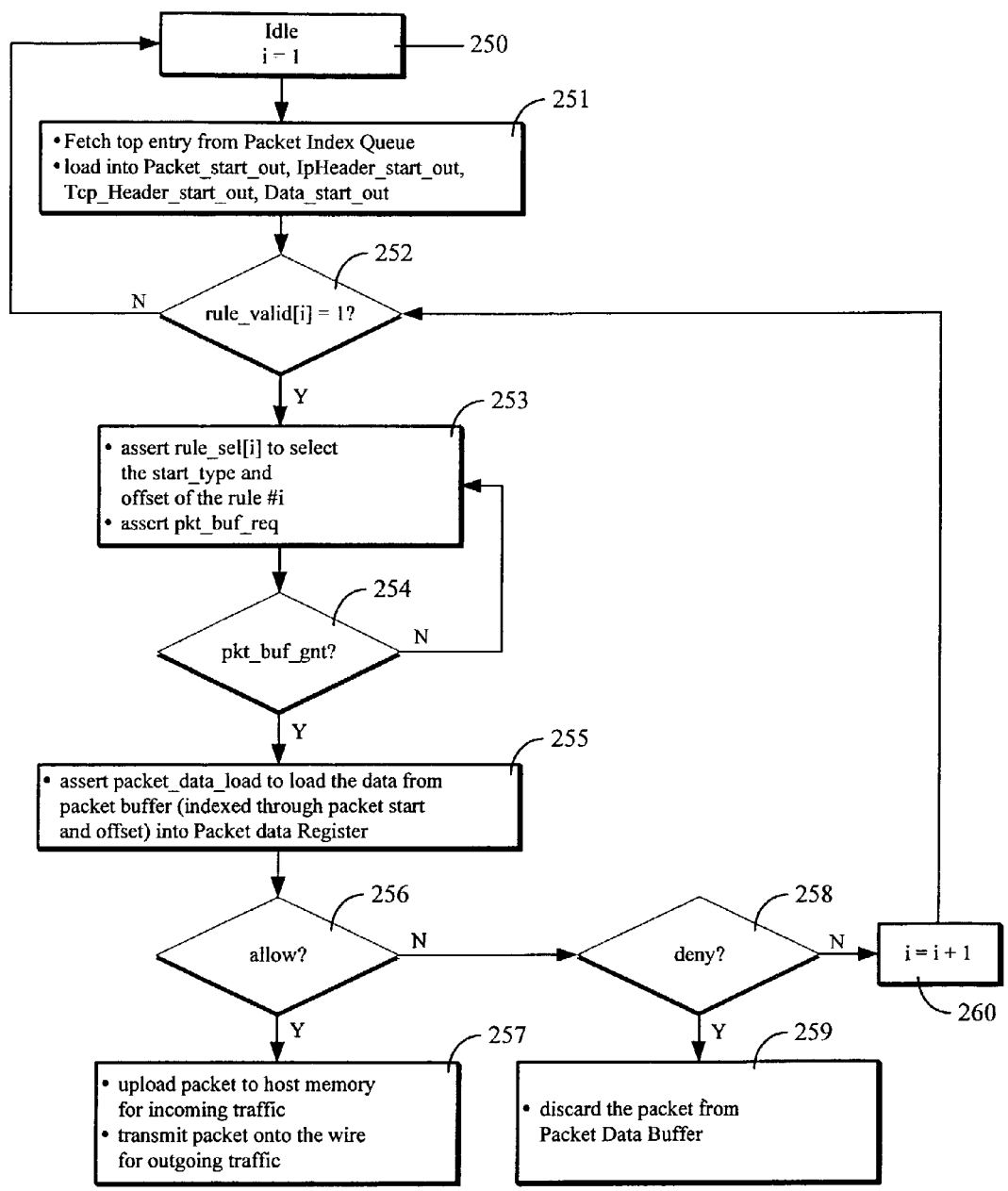
FIG. 7 is a simplified flow diagram for the rule check engine in the system of FIG. 6B.

Thus, as described above, each packet may have multiple rules to be applied by the rule check engine, which operates for example as shown in FIG. 7. The process begins in an idle state, in which the index value "i" is set equal to 1 (block 250). Upon detecting that the Packet Index queue is not empty, rule check will be initiated, and the process proceeds to block 251. In block 251, the first entry in the Packet Index Queue will be loaded into Packet_start_out, IpHeader_start_out, TcpHeader_start_out and Data_start_out registers (114-117). The lowest bit in Rule Valid Register will be checked (block 252). If the valid bit is set to 1, a valid rule exists. If a valid rule exists for index "i", the rule check logic will be invoked. The control parameter rule_sel[i] (while i=1 for the first rule) will be asserted to select the corresponding rule's start_type (packet start, IP header start, TCP header start or data start) and offset field (a byte count from the start location). The starting location of the packet indexed with the offset will be used as the address to access packet data in Packet Data Buffer. The signal pkt_buf_req will be asserted to request the Packet Data Buffer access (block 253). After pkt_buf_gnt is returned (block 254), the data being accessed within a packet will be read from the packet buffer, and loaded into the packet data register (block 255). This data will be compared with the data specified in the Rule Data Register, with a mask applied through Rule Mask Register. The rule parameter operation_sel_i will be used to select the operation mode (=, !=, >, <) to be used for comparison. A rule_match_i signal will be asserted upon rule match.

The rule parameter action_sel_i (specified in Rule Config Register) can be used to select the needed action upon rule match. Packet can be allowed, denied or combined logically (e.g. AND) with the subsequent rules to determine the required action.

If the packet is to be allowed (block 256), it will be submitted to upload or transmit (block 257). If the packet is to be denied (block 258), the denied packet will be discarded from Packet Data Buffer (block 259). If the packet is neither allowed nor denied, in the index "i" is incremented by 1 (block 260). The process then returns to block 252 to test the next rule.

If the action select value action_sel n indicates the action "AND with next rule," then the allow and deny signals are not asserted, and only when all the ANDed rules have been applied will the engine take action with the corresponding packet. In this example, the combination of rules that may be applied for a given allow/deny decision is limited by the "AND with next rule" action. Other embodiments allow for other rule combinations to be applied, by providing for the use of rule output mask registers, or other logical operators for the purposes of rule combinations. For example, when multiple protocols are supported, a rule output mask may be utilized to select an appropriate set of valid rules After all the rules for the current packet are evaluated, control will move to the next packet. The above steps will be repeated until all the packets in Packet Index Queue have been processed for rule check.

Reference is made to FIGS. 8-14 for a description of one embodiment of logic to manage class of service using the priority output 240 from selector 239 of FIG. 6B, or other priority determination logic.

Figure 8:
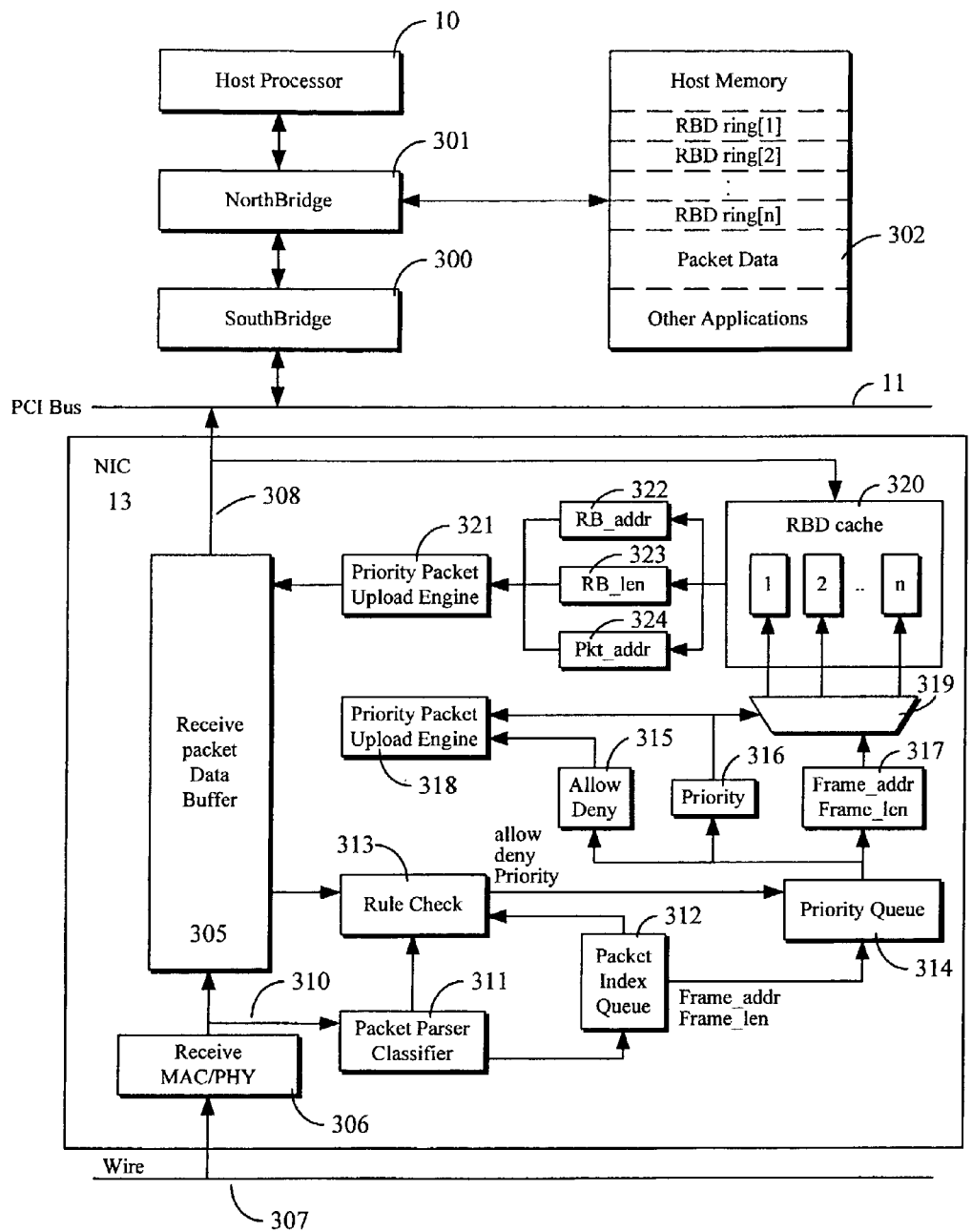
FIG. 8 is a simplified diagram of a system providing for management of class of service according to one embodiment of the present invention.

FIG. 8 illustrates a basic block diagram of any data processing system including a NIC 13, host bus system 11, and host CPU 10 as illustrated in FIG. 1 for the purposes of describing the management of class of service. In a host bus system running a PCI bus protocol, a typical configuration includes a so-called "southbridge" 300 coupled to the bus 11. A "northbridge" 301 is coupled to the southbridge, and to high-speed host memory 302. The host CPU 10 is coupled to the northbridge 301. Other configurations of host bus systems may be utilized as well, providing access by the host processor 10 to the host memory 302. The host memory 302 is used for a variety purposes, including storing packet data uploaded or ready to be downloaded to the NIC 13, receive buffer descriptor RBD lists, and memory for other applications. Such data may also be stored in other host memory accessible using the host bus system 11. In this example, the receive buffer descriptor RBD lists are implemented in a ring format, and include RBD ring [1], RBD ring [2], . . . RBD ring [n]. According to this embodiment each ring [1, . . . , n] is utilized for a different class of service having respective priorities. The host driver software sets up the RBD rings in host memory to support the class of service management. Packets that qualify for a given ring, and the corresponding class of service, are identified in the interface.

In FIG. 8, functional components of the NIC 13 supporting management of class of service are illustrated. Thus, a receive packet data buffer 305 is coupled by an incoming data path 310 to the MAC and physical interface 306, which is in turn coupled to the network medium 307. The buffer 305 is coupled via line 308 to the host bus system 11. The incoming data path 310 is coupled to a packet parser/classifier 311, like that described above with respect to FIG. 2. A packet index queue 312 is produced as described above. The packet index queue 305 is used by the rule check engine 313, as described above with respect to FIGS. 6A, 6B and 7. The packet index queue 312 and rule check engine 313 supply parameters to the priority queue block 314. The priority queue block 314 supplies allow/deny signals 315, priority signals 316, and packet address and packet length values 317, referencing the receive packet data buffer 305, as outputs. The allow/deny signal from register 315 is applied to a priority queue fetch engine 318. Likewise, the priority value from register 316 is applied to the priority queue fetch engine 318. The packet address and packet length values from register 317 are applied to the selector 319, which directs the values to an appropriate ring segment in a receive buffer descriptor cache 320. The receive buffer descriptor cache 320 stores at least a portion of each of the active receive buffer descriptor rings in the host memory 302, which are active during the uploading of the packet. While packets are available for upload, the priority packet upload engine 321 accesses an entry from the highest priority ring in the receive buffer descriptor cache 320 and receives the receive buffer address RB_addr 322 and the receive buffer length RB_len 323 for the host buffer in host memory, as well as the packet address Pkt_addr 324 for the corresponding packet in the receive packet data buffer 305. These parameters are utilized to control uploading of the corresponding packet into the host memory or other locations accessible via the host bus system.

Figure 9:
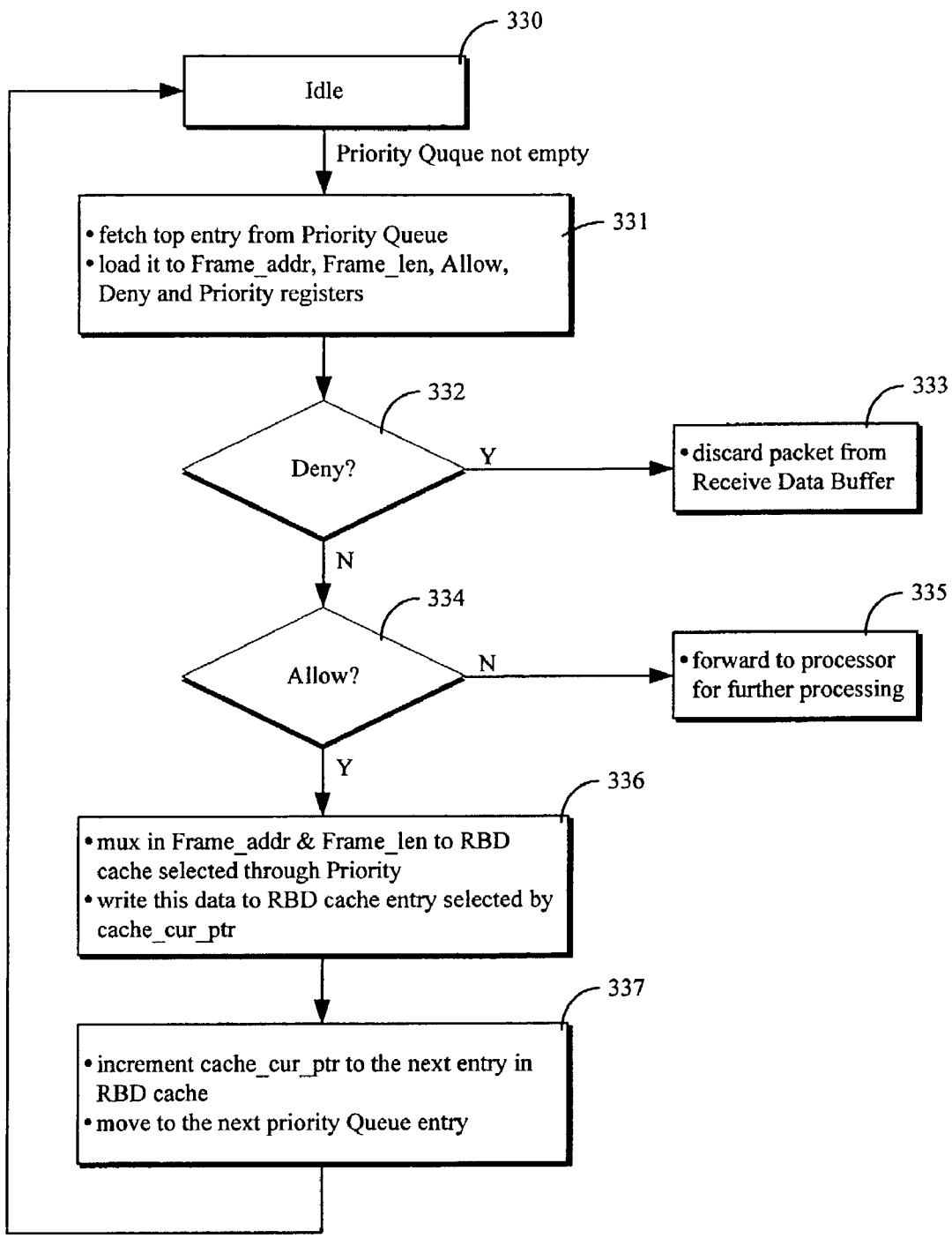
FIG. 9 is a simplified flow diagram for the priority queue fetch engine for the system of FIG. 8.

Operation of the priority queue fetch engine 318 is described with reference to FIG. 9. But the process begins in an idle state (block 330). When the Priority Queue is not empty, the priority queue fetch engine 318 will be activated to fetch the top entry from the Priority Queue. This information will be loaded into Allow, Deny, Priority, Packet_addr and Packet_len registers (block 331). If the packet is to be denied (block 332), the packet will be discarded from receive packet data buffer to free up the space (block 333). Otherwise, if the packet is to be allowed (block 334), the corresponding RBD cache ring will be selected through the packet priority level. Packet_addr and Packet_len will be stored into a corresponding cache entry pointed by the output of selector 319, which can then be used by priority packet upload engine 321 to upload the packet through PCI Bus to host memory (block 334). If the packet is neither to be allowed nor to be denied, it may need further inspection. The host processor, or other processing resources, can be invoked to determine the needed action (block 335).

After the packet information has been stored into its RBD cache entry, then a cache pointer cache_cur_ptr will be incremented by one point to the next RBD cache entry. The next Priority Queue entry will then be available for access by the priority queue fetch engine 318 (block 337).

Figure 10:
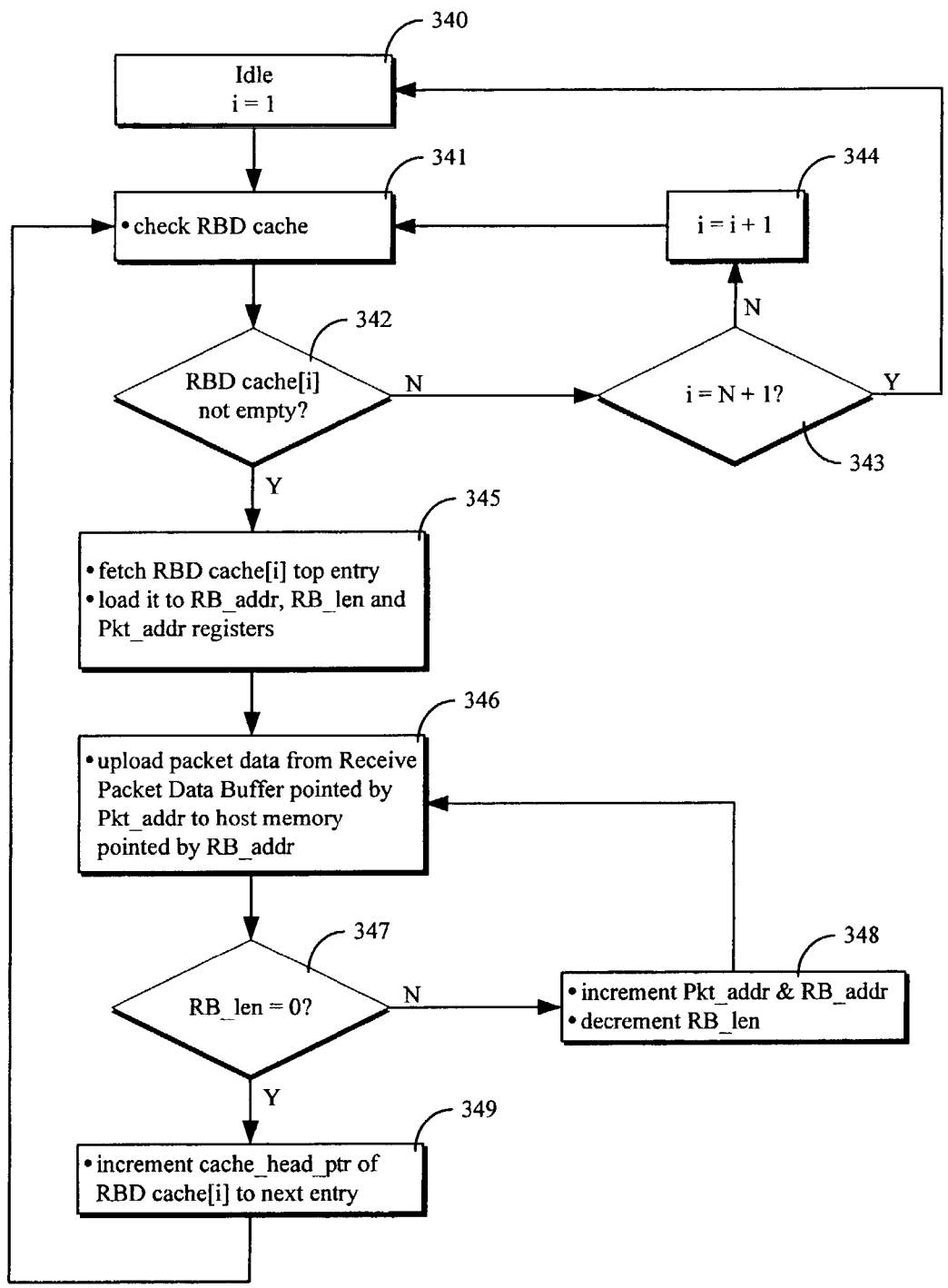
FIG. 10 is a simplified flow diagram for the priority packet uploaded engine for the system of FIG. 8.

Operation of the priority packet upload engine 321 is described with reference to FIG. 10. While in idle state, index "i" will be set to 1, which will allow the highest priority RBD cache (RBD cache ring [1]) to be used for handling the priority packet upload operation (block 340). Next, the appropriate RBD cache ring is checked (block 341). If this cache is empty (block 342), the process determines whether the last ring has been checked (block 343). If the last ring has been checked, loop returns to block 340. If the last ring has not been checked, "i" will be incremented by one, to point to the next priority RBD cache ring (block 344). If at block 342, the appropriate RBD ring is not empty, then the top entry of this RBD cache ring will be fetched. The information stored in this entry will be loaded into RB_addr, RB_len and Pkt_addr registers (block 345). The RB_addr is used to identify the host memory location for the packet to be uploaded. RB_len is used to indicate the host memory receive buffer size. Pkt_addr is used to locate the packet address in NIC's receive packet data buffer. The packet data stored in receive packet data buffer pointed by Pkt_addr register will be uploaded into the host memory receive buffer pointed by RB_addr (block 346). Next, the algorithm determines whether the RB_len parameter has been decremented to all 0 (block 347). Each time a packet data is uploaded, Pkt_addr and RB_addr will be incremented by one to retrieve the next packet data from NIC's receive packet data buffer and upload it into the next host memory location. Also, the RB_len will be decremented by one to indicate the packet length remaining to be uploaded (block 348). This process will repeat itself until all the packet data has been uploaded into host memory, indicated when the RB_len count reaches zero. The algorithm then returns to block 341 to access the next cache entry.

If there are any additional entries available in the same RBD cache, above process will be repeated until all the entries are being handled. Otherwise, "i" will be incremented by one to access the next priority RBD cache (RBD cache ring [2]) (block 344). Each entry in this RBD cache will be fetched and used the same way to upload the received packet from receive packet data buffer into host memory until all the entries in this RBD cache are being serviced. Each RBD cache will be accessed in above sequence by incrementing "i" until it reaches "n+1", which indicates that all the RBD caches have been used (block 343). Control will go back to idle waiting for the next available RBD cache.

Figure 11:
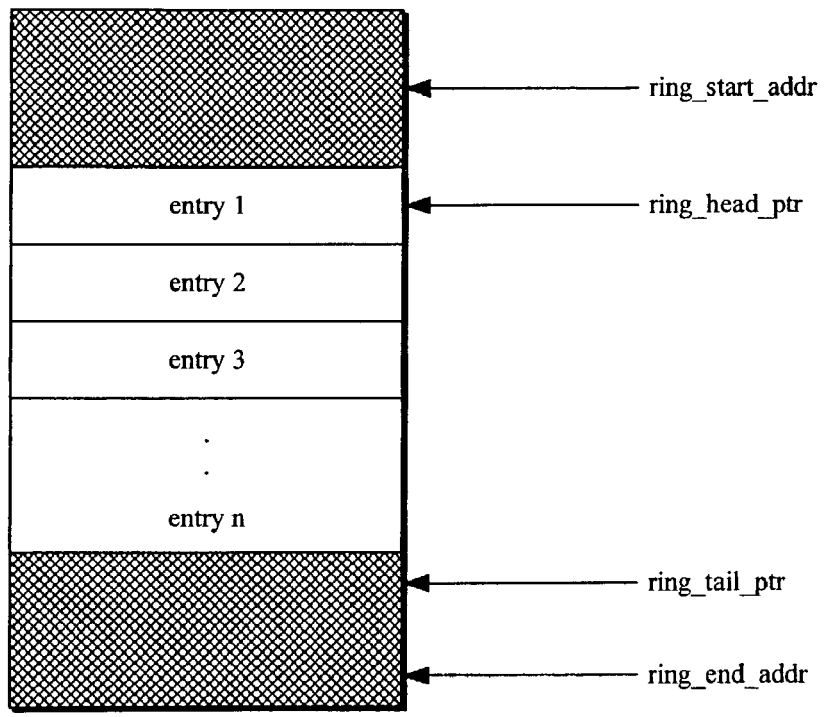
FIG. 11 illustrates a structure for a receive buffer descriptor ring in host memory according to one embodiment of the invention.

The receive buffer descriptor structure is described with reference to FIGS. 11 through 14 for one preferred example of the present invention. FIG. 11 represents the receive buffer descriptor ring in host memory. The ring includes a plurality of entries, entry 1, entry 2, entry 3, . . . entry n. The ring memory space is defined by a starting address ring_start_addr, and ending address ring_end_addr. The plurality of entries are located within the memory space by a ring_head_ptr pointing to the first entry in the list, and a ring_tail_ptr which points to a data location following the last entry in the list. The RBD rings are used to store the RBDs which can be used to upload the received packets from receive packet data buffer into host memory. There are "1~n" RBD rings constructed in host memory with "1" to be assigned as the highest priority and "n" to be the lowest priority. These RBDs are set up by a driver, usually under control of the host system, and are prefetched into NIC's local RBD cache using a cache management routine. Each ring shares the same data structure with ring_start_addr and ring_end_addr to define the address space for each ring in host memory. The ring_head_ptr points to the top entry within each ring that is available for prefetch into local RBD cache, for use by an upload operation. The ring_tail_ptr points to the first available entry for a next RBD entry to be appended to the list by the driver.

Figure 12:
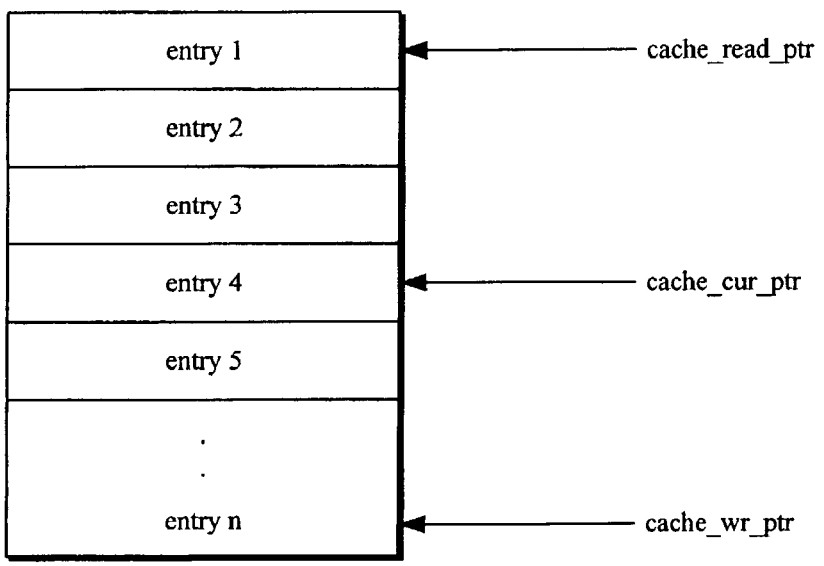
FIG. 12 illustrates a structure for a receive buffer descriptor cache according to one embodiment of the present invention.

FIG. 12 illustrates the RBD cache data structure. The RBD cache stores a subset of the RBD entries from the host rings, in memory on the NIC to allow fast descriptor access by Upload Engine to transfer the received packets into host memory. The RBDs in host memory can be prefetched into NICs RBD cache in burst mode. Each RBD cache has a set of pointers, including a read pointer cache_read_ptr, a write pointer cache_wr_ptr, and pointer to a current entry cache_cur_ptr. The cache_read_ptr can be used by the Upload Engine to fetch the top entry from RBD cache. The cache_wr_ptr can be used to transfer the RBDs from host memory into RBD cache. The cache_cur_ptr can be used by Priority Queue Fetch Engine to store the received packet address and length in the buffer memory, which can then be used by the Upload Engine to upload the received packet from receive packet data buffer into host memory.

Figure 13:
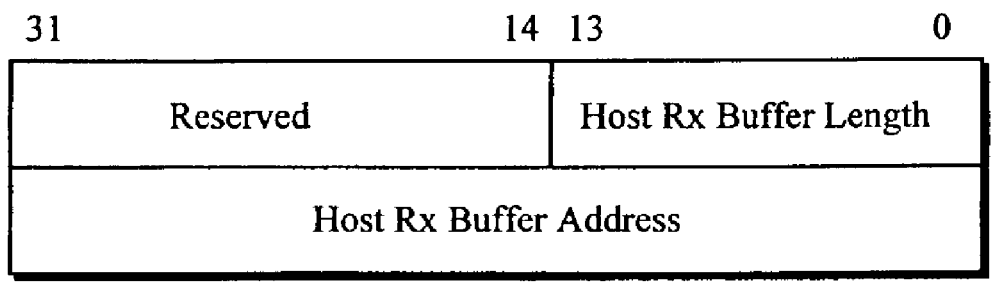
FIG. 13 illustrates a format for a receive buffer descriptor before allocation to a particular packet according to one embodiment of the invention.
Figure 14:
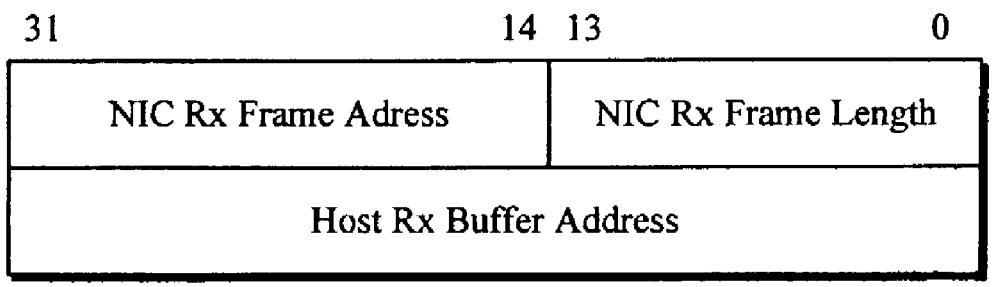
FIG. 14 illustrates a format for a receive buffer descriptor after allocation to a particular packet according to one embodiment of the invention.

FIGS. 13 and 14 illustrate the structure of the descriptors for one embodiment of the invention. FIG. 13 illustrates the structure before a packet is allocated to the descriptor. Each Receive Buffer Descriptor (RBD) prefetched from host memory to RBD cache on the NIC has the format of FIG. 13, which consists of Host Rx Buffer Address and Host Rx Buffer Length. Host Rx Buffer address and length are provided and set up in host memory through the driver, and locate the receive buffer in host memory for the packet to be uploaded. The Host Rx Buffer Length field occupies the bits 13:0 of a first word in the descriptor. The Host Rx Buffer Address occupies bits 31:0 of a second word. Bits 31:14 of the first word are reserved.

After the information for the received packet is fetched from the priority queue, the descriptor format is changed to that shown in FIG. 14. In the format of FIG. 14, the NIC received packet address will be stored in bits 31:14 of the first word, and the NIC received packet length will replace Host Rx Buffer Length in bits 13:0 of the first word. While Host Rx Buffer address can be used to locate the Rx Buffer in host memory for the packet to be uploaded, the NIC received packet address and length can be used to access the received packet in receive packet data buffer to be uploaded through PCI bus to host memory.

In summary, a data processing system adapted for high-speed network communications, a method for managing a network interface and a network interface for such system, are provided, in which processing of packets received over the network is achieved by embedded logic at the network interface level. Incoming packets on the network interface are parsed and classified as they are stored in a buffer memory. Functional logic coupled to the buffer memory on the network interface are enabled to access any data field within a packet in a single cycle, using pointers and packet classification information produced by the parsing and classifying step. Results of operations on the data fields in the packets are available before the packets are transferred out of the buffer memory. A data processing system, a method for management of a network interface and a network interface are also provided by the present invention that include an embedded firewall at the network interface level of the system, which protects against inside and outside attacks on the security of data processing system. Furthermore, a data processing system, a method for management of a network interface and a network interface are a provided by the present invention that support class of service management for packets incoming from the network, by applying priority rules at the network interface level of the system.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of managing packet transmission at an interface between a network medium and a host system, the method comprising:

parsing an incoming packet comprising a data payload destined for an application running in the host system memory, wherein parsing an incoming packet includes determining and storing a classifier for the incoming packet;

generating one or more pointers to data fields in the incoming packet;

storing the incoming packet in a buffer memory;

using the one or more pointers to retrieve data associated with the data fields from the buffer memory;

applying one or more rules to the retrieved data to determine a priority for transferring the data payload associated with the retrieved data from the buffer memory to the host system memory, wherein the classifier indicates which of the one or more rules is applied to the retrieved data associated with the data fields of the incoming packet; and using the one or more pointers to transfer the data payload associated with the retrieved data from the buffer memory to an application running in the host system memory according to the determined priority.

2. The method of claim 1 wherein generating one or more pointers to data fields in the incoming packet comprises generating a pointer to the start of the packet.

3. The method of claim 1 wherein generating one or more pointers to data fields in the incoming packet comprises generating a pointer to the Internet Protocol header of the packet.

4. The method of claim 1 wherein generating one or more pointers to data fields in the incoming packet comprises generating a pointer to the Transmission Control Protocol header of the packet.

5. The method of claim 1 wherein generating one or more pointers to data fields in the incoming packet comprises generating a pointer to the data payload portion of the packet.

6. The method of claim 1 wherein generating one or more pointers to data fields in the incoming packet and storing the incoming packet in a buffer memory occurs contemporaneously.

7. The method of claim 1 wherein using the one or more pointers to retrieve the data associated with the data fields from the buffer memory comprises using the one or more pointers in combination with one or more offset parameters to retrieve data the data associated with the fields of the incoming packet from the buffer memory.

8. The method of claim 1 wherein each rule of the one or more rules comprises a rule data value and a rule parameter selected from the group of rule parameters consisting of:
an "equal to" rule parameter for determining whether the rule data value is equal to the retrieved data;
a "not equal to" rule parameter for determining whether the rule data value is not equal to the retrieved data;
a "greater than" rule parameter for determining whether the rule data value is greater than the retrieved data; and
a "less than" rule parameter for determining whether the rule data value is less than the retrieved data.

9. The method of claim 1 wherein applying one or more rules to the retrieved data associated with the data fields to determine a priority for transferring the data payload associated with the retrieved data from the buffer memory to an application running in the host system memory comprises, for each rule:
storing the rule data value;
storing the retrieved data; and
performing the function specified by the rule parameter.

10. The method of claim 1 wherein using the one or more pointers to transfer the data payload associated with the retrieved data from the buffer memory to an application running in the host system memory according to the determined priority comprises:
maintaining a plurality of receive buffer descriptor ring segments, wherein each receive buffer descriptor ring segment corresponds to a receive buffer descriptor ring in the host system memory, wherein each receive buffer descriptor ring corresponds to a priority queue, wherein each receive buffer descriptor ring segment comprises a plurality of receive buffer descriptor entries, and wherein each receive buffer descriptor entry includes a pointer to a buffer memory location corresponding to an incoming packet;
assigning an incoming packet to a receive buffer descriptor entry, wherein the assigned receive buffer entry is in a receive buffer descriptor ring segment having a priority corresponding to the priority of the incoming packet; and
transferring the data payload of the incoming packet from the buffer memory to an application running in the host system memory based on the received buffer descriptor entry to which the incoming packet was assigned.

11. The method of claim 10 wherein each receive buffer descriptor entry of the plurality of receive buffer descriptor entries comprises:
an address field for holding a host memory address for a corresponding receive buffer descriptor in the host system;
a data length field for holding a value indicating a length of a packet assigned to the entry; and
a pointer field for holding a pointer to the assigned packet in the buffer memory.

12. A system to manage packet transmission at an interface between a network and a host system, the system comprising:
a packet parser to generate one or more pointers to data fields in the incoming packet and to determine a classifier for the incoming packet, wherein the incoming packet comprises a data payload destined for an application running in the host system memory;
a packet index queue to store the one or more pointers to the data fields;
a packet data buffer to store the incoming packet;
a packet index fetch engine to retrieve data associated with the data fields from the packet data buffer by using the pointers from the packet index queue; and
a rule check engine to apply one or more rule match operations on the retrieved data to determine a priority for transferring the data payload associated with the retrieved data from the buffer memory to an application running in the host system memory, wherein the classifier indicates which of the one or more rules is applied to the retrieved data.

13. The system of claim 12 further comprising:
a receive buffer descriptor cache to maintain a plurality of receive buffer descriptor ring segments, wherein each receive buffer descriptor ring segment corresponds to a receive buffer descriptor ring in the host system memory, wherein each receive buffer descriptor ring corresponds to a priority queue, wherein each receive buffer descriptor ring segment comprises a plurality of receive buffer descriptor entries, and wherein each receive buffer descriptor entry includes a pointer to a buffer memory location corresponding to an incoming packet; and
a priority packet upload engine that accesses each receive buffer descriptor entry in each receive buffer descriptor ring segment according to each receive buffer descriptor ring segment's priority, and transfers the data payload of the incoming packet assigned to the accessed receive buffer descriptor entry from the buffer memory to the host system memory.

14. The system of claim 13 wherein each receive buffer descriptor entry of the plurality of receive buffer descriptor entries comprises:
an address field for holding a host memory address for a corresponding receive buffer descriptor in the host system;
a data length field for holding a value indicating a length of a packet assigned to the entry; and
a pointer field for holding a pointer to the assigned packet in the buffer memory.

15. The system of claim 12 wherein the packet parser generates a pointer to the start of the incoming packet.

16. The system of claim 12 wherein the packet parser generates a pointer to the Internet Protocol header of the incoming packet.

17. The system of claim 12 wherein the packet parser generates a pointer to the Transmission Control Protocol header of the incoming packet.

18. The system of claim 12 wherein the packet parser generates a pointer to the data payload of the incoming packet.

19. The system of claim 12 wherein the packet index queue stores the pointers and the packet data buffer stores the incoming packet contemporaneously.

20. The system of claim 12 wherein the rule check engine comprises a rule match block and a rule action block.

21. The system of claim 12 wherein the rule match block comprises:
a packet data register to store the retrieved data associated with the data fields for comparison; and a rule data register to specify a rule to be compared with the retrieved data associated with the data fields.

22. The system of claim 21 wherein the rule match block further comprises a rule mask register to mask any number of the lower bits between the rule data register and the packet data register.

23. The system of claim 21 wherein the rule in the rule data register to be compared with the retrieved data in the packet data register comprises a rule data value and a rule parameter selected from the group of rule parameters consisting of:

an "equal to" rule parameter to determine whether the rule data value in the rule data register is equal to the retrieved data in the packet data register;

a "not equal to" rule parameter to determine whether the rule data value in the rule data register is not equal to the retrieved data in the packet data register;

a "greater than" rule parameter to determine whether the rule data value in the rule data register is greater than the retrieved data in the packet data register; and a "less than" rule parameter to determine whether the rule data value in the rule data register is less than the retrieved data in the packet data register.

24. The system of claim 21 wherein the rule action block is coupled to the rule match block and generates a priority signal in response to an output from the rule match block, wherein the priority signal indicates the priority of the incoming packet associated with the retrieved data.

25. The system of claim 21 wherein a plurality of rule match blocks corresponding to a plurality of rules are cascaded to apply the plurality of rules to the retrieved data in the packet data register.

26. A single integrated circuit, comprising:

a microprocessor, the microprocessor to perform the steps of:

parsing an incoming packet, wherein the incoming packet comprises a data payload destined for an application running in the host system memory, and wherein parsing an incoming packet includes determining and storing a classifier for the incoming packet;

generating one or more pointers to data fields in the incoming packet;

storing the incoming packet in a buffer memory;

using the one or more pointers to retrieve data associated with the data fields from the buffer memory;

applying one or more rules to the retrieved data to determine a priority for transferring the data payload associated with the retrieved data from the buffer memory to the host system memory, wherein the classifier indicates which of the one or more rules is applied to the retrieved data; and using the one or more pointers to transfer the data payload associated with the retrieved data from the buffer memory to an application running in the host system memory according to the determined priority.

* * * * *